Nov. 30, 1965  R. M. HAYES  3,221,306
CARD PROCESSING SYSTEM
Filed June 2, 1959  9 Sheets-Sheet 1

INVENTOR:
Robert M. Hayes
By Smyth & Roston
Attorneys

INVENTOR:
Robert M. Hayes
Attorneys

Nov. 30, 1965  R. M. HAYES  3,221,306
CARD PROCESSING SYSTEM
Filed June 2, 1959  9 Sheets-Sheet 5
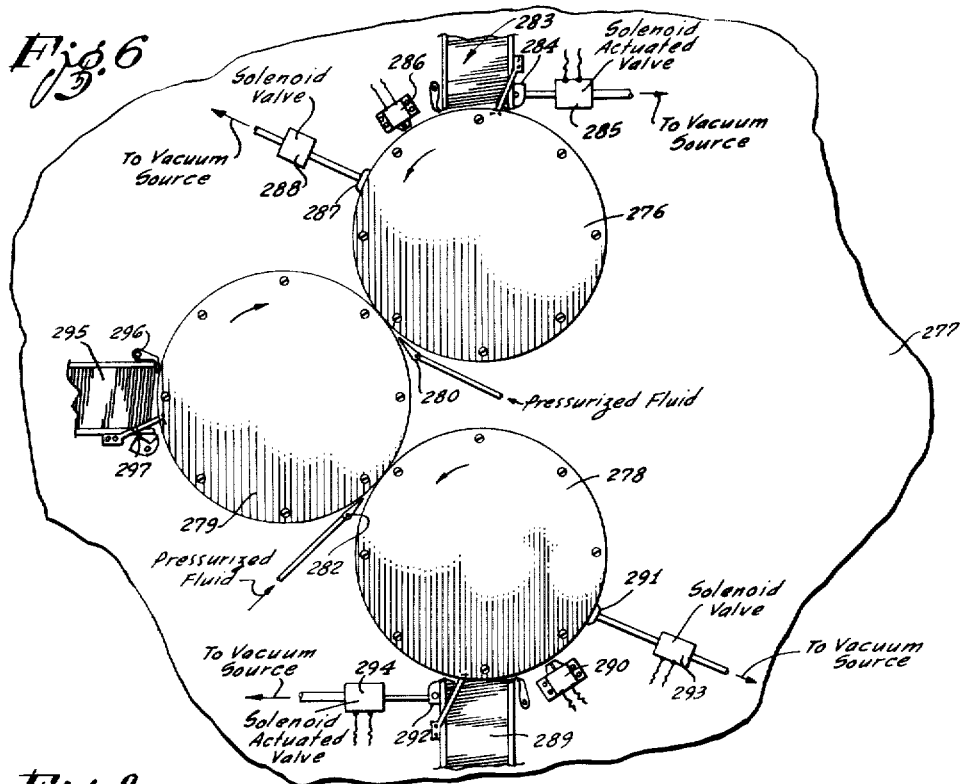
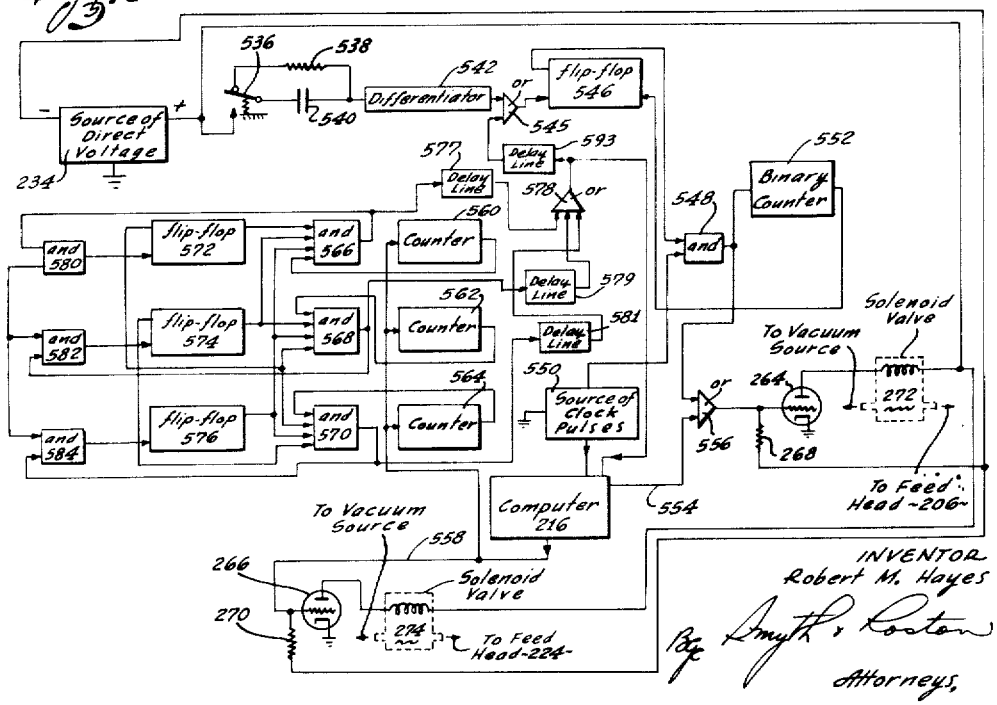
INVENTOR
Robert M. Hayes
Attorneys

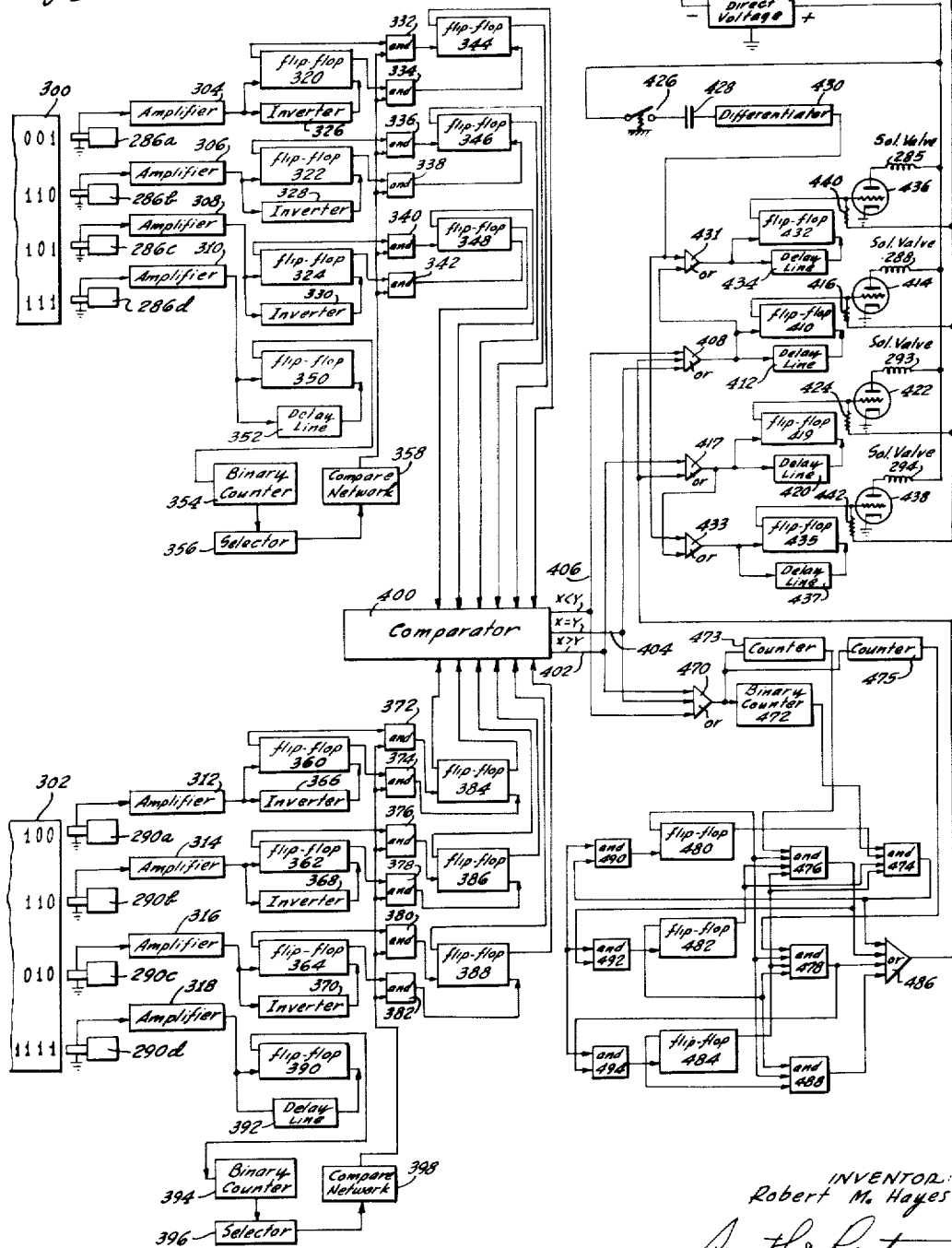

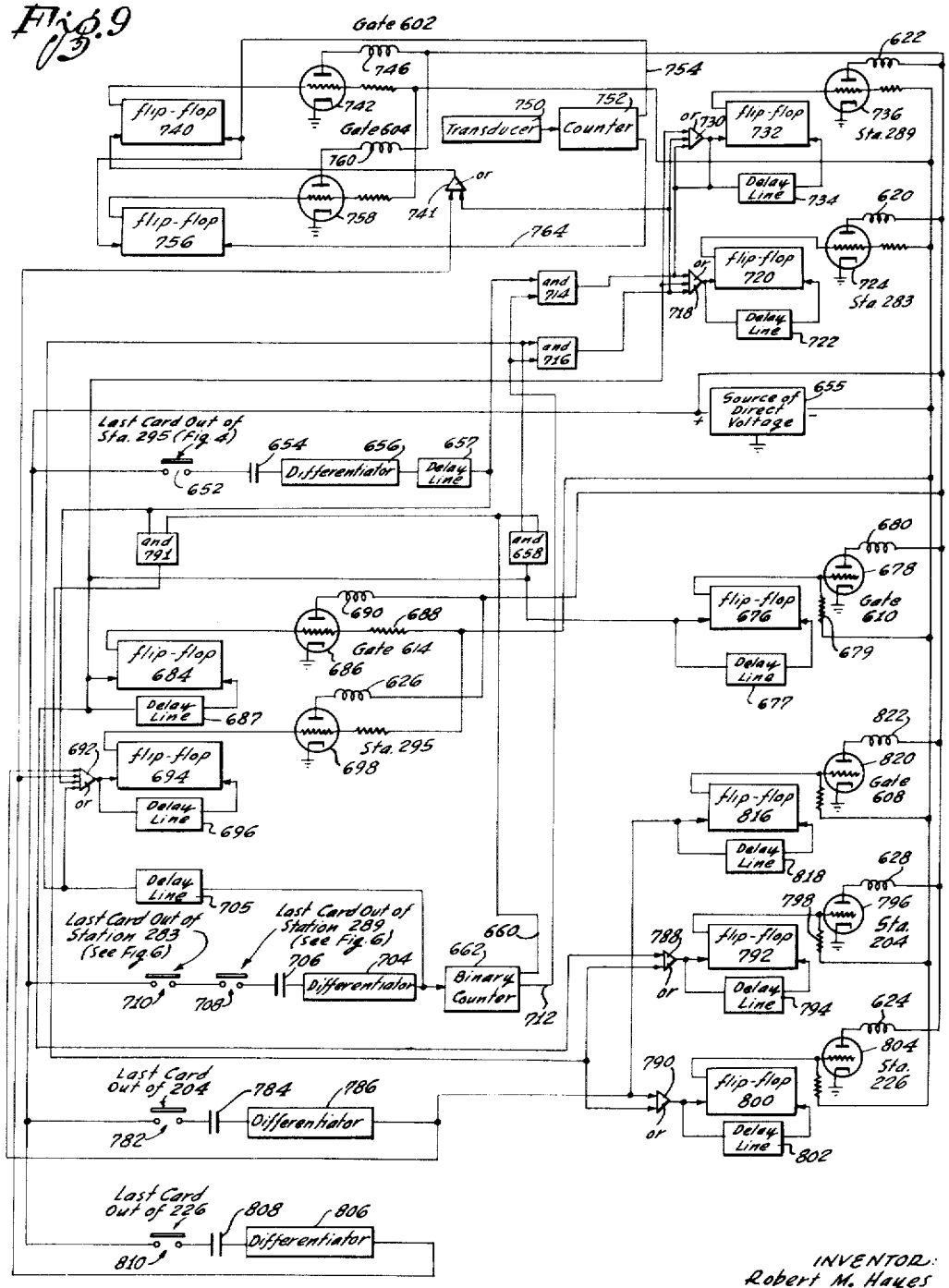

Fig. 10

| Col. | A | B | C | D | E | F | G |
|---|---|---|---|---|---|---|---|
| Card 1 | 77 | 03 | 03 | 03 | 03 | 03 | 02 |
|  | 90 | 16 (1st Sub-group of 2 Cards) | 16 | 16 | 16 | 08 | 04 |
|  | 03 | 77 | 77 | 29 | 29 | 16 | 05 |
|  | 16 | 90 | 90 | 42 | 42 | 21 | 11 |
| Card 2 | 29 | 29 | 29 | 55 | 08 | 29 | 03 |
|  | 42 | 42 | 42 | 69 | 21 | 34 | 08 |
|  | 69 | 55 | 55 | 77 | 34 | 42 | 16 |
|  | 55 | 69 | 69 | 90 | 47 | 47 | 21 |
| Card 3 | 82 | 08 | 08 | 08 | 55 | 55 | 14 |
|  | 95 | 21 | 21 | 21 | 69 | 60 | 16 |
|  | 08 | 82 | 82 | 34 (2nd Sub-group of 4 Cards) | 77 | 69 | 17 |
|  | 21 | 95 | 95 | 47 | 90 | 73 | 19 |
| Card 4 | 60 | 34 (2nd Sub-group of 2 Cards) | 34 | 60 | 60 | 77 | 29 |
|  | 47 | 47 | 47 | 73 | 73 | 82 | 34 |
|  | 34 | 60 | 60 | 82 | 82 | 90 | 42 |
|  | 73 | 73 | 73 | 95 | 95 | 95 | 47 |
| Card 5 | 11 | 05 | 04 | 04 | 02 | 02 | 33 |
|  | 05 | 11 | 14 | 05 | 16 | 04 | 35 |
|  | 94 | 72 | 76 | 11 | 17 | 05 | 72 |
|  | 72 | 94 | 89 | 14 | 19 | 11 | 76 |
| Card 6 | 89 | 04 (3rd Sub-group of 2 Cards) | 05 | 72 | 04 | 14 | 55 |
|  | 76 | 14 | 11 | 76 (2nd Sub-group of 4 Cards) | 05 | 16 | 60 |
|  | 14 | 76 | 72 | 89 | 11 | 17 | 69 |
|  | 04 | 89 | 94 | 94 | 14 | 19 | 73 |
| Card 7 | 17 | 16 | 02 | 02 | 33 | 33 | 77 |
|  | 33 | 17 (4th Sub-group of 2 Cards) | 19 | 16 | 35 | 35 | 82 |
|  | 35 | 33 | 81 | 17 | 81 | 72 | 90 |
|  | 16 | 35 | 98 | 19 | 98 | 76 | 95 |
| Card 8 | 98 | 02 | 16 | 33 | 72 | 81 | 81 |
|  | 02 | 19 | 17 | 35 | 76 | 89 | 89 |
|  | 19 | 81 | 33 | 81 | 89 | 94 | 94 |
|  | 81 | 98 | 55 | 98 | 94 | 98 | 98 |

INVENTOR:
Robert M. Hayes

Attorneys

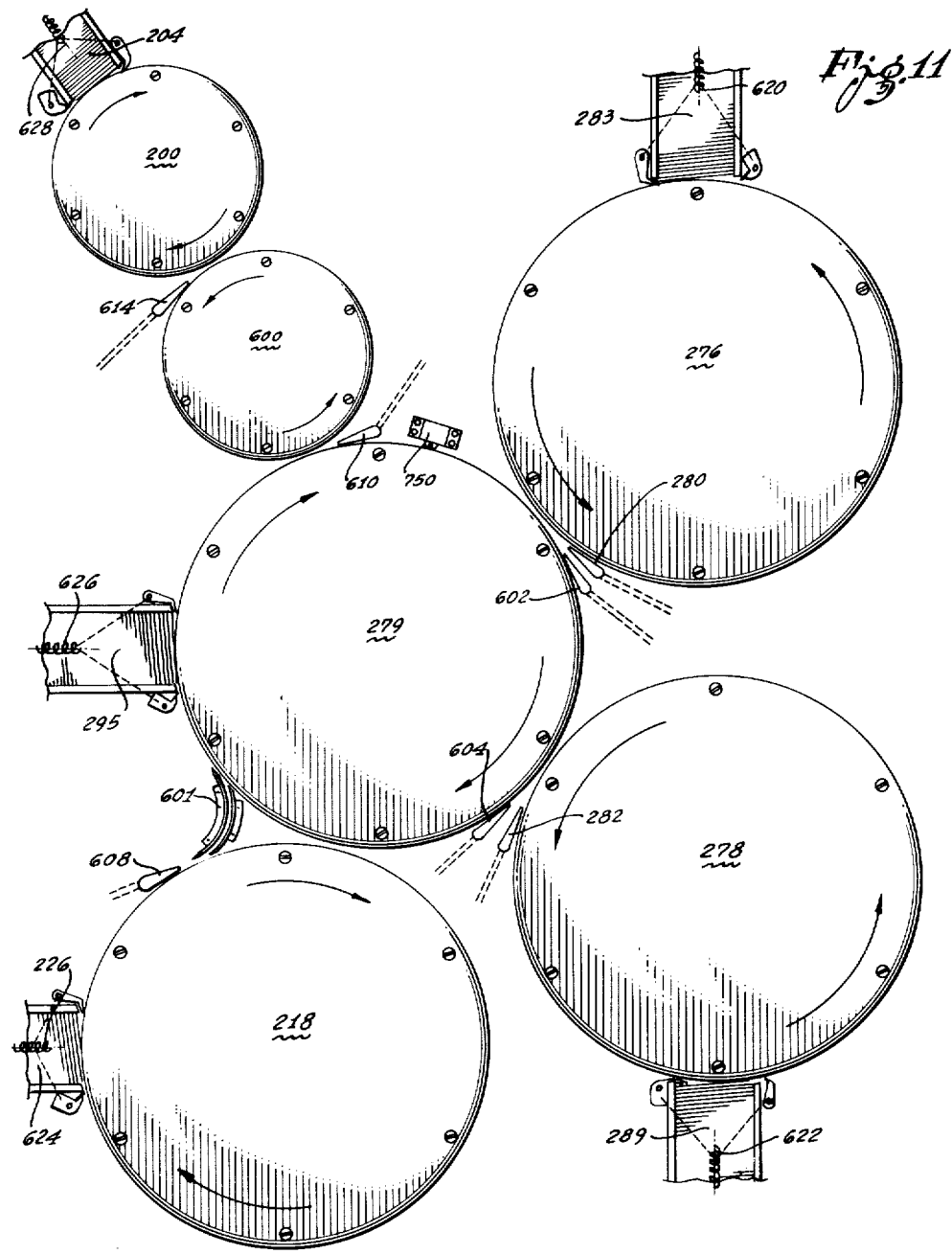

3,221,306
CARD PROCESSING SYSTEM
Robert M. Hayes, Sherman Oaks, Calif., assignor to The
Magnovox Company, Los Angeles, Calif., a corporation
of Delaware
Filed June 2, 1959, Ser. No. 817,653
17 Claims. (Cl. 340—172.5)

This invention relates to a card processing system for information storage cards. The information relates more particularly to a card processing system which rearranges cards and also rearranges information internally in the cards to obtain a proper sequence of information on each card and on successive cards in the rearrangement. The invention also relates to methods of rearranging data on cards to obtain the disposition of the information into a particular sequence in each card and on successive cards.

Data processing systems have been built in recent years for storing a large quantity of different items and for making these items available for processing. In such systems, each item is generally represented by a multi-digit binary number which is recorded on a suitable storage medium such as a tape. When a particular item is required, the system drives the tape and searches the information from the tape until the desired item is reached. In this way, information relating to all of the items in large operations such as department stores can be stored and processed so that a ready inventory may be made available on each of the items sold in the store.

It is often desirable to sort the different items in the data processing system into a particular order to minimize the access time to any particular item. For example, items represented by the multi-digit binary numbers may be arranged in a numerical progression to represent a desired order of items. By storing the items in a progressive order, various short-cuts may be made to speed the tape search until a particular area of the tape is reached, this particular area being in the approximate vicinity of the desired item. For example, the tape may be run at high speed until the particular area is reached and then may be run at a reduced speed while the particular area is being searched for the desired item.

Magnetic tape systems have been primarily used thus far for storing a plurality of items in a data processing system. In such systems, the tape is moved past a head or a plurality of heads so that successive items on the tape can be read and so that selected items can be processed after they have been read. A computer is used in conjunction with the magnetic tape to receive the different items stored in the magnetic tape and to sort these items into the desired sequence. The items are then returned to the tape in sorted form so that the time for subsequently processing different items of information can be minimized.

There are several disadvantages with a system using a combination of a magnetic tape and computer. One disadvantage is that considerable time is lost while the tape is moved to the position at which an item desired for processing may be located. This is true even when the tape is initially driven at a high speed until the proximate location of a desired item is reached.

Another disadvantage with the systems using tapes and computers is that the computer must have a relatively large capacity in order to be able to receive the items stored in the tape and rearrange the items into a desired sequence. A computer with a large capacity is disadvantageous because of the high cost required to build the computer, because of the high costs required to service and maintain the computer in a proper operation and because of the large space required to house the computer. The disadvantage is further aggravated by the fact that the large capacity of the computers is required only a relatively small portion of the total time in which the data processing system may be used.

Instead of storing all of the different items on a single tape, each item may be stored on a separate card. The various items may then be sorted into a proper sequence by rearranging the different cards. This type of system has the advantage of increased flexibility in processing data in comparison to the system using magnetic tape. One reason is that the different cards can be directed into different paths in accordance with the different types of operations to be performed on the items stored on the cards. A disadvantage of the system is that a large number of cards has to be used. This requires that large equipment be used to process the cards and that considerable space be required to house the equipment.

This invention provides a system which combines the advantages of systems using tapes and cards. In this system, cards are used and a plurality of items are stored on each card. By providing a plurality of items on each card, the number of cards can be reduced to a reasonable number. At the same time, the flexibility of the system using cards is retained so that the information on the cards can be processed in ways that would not be available with systems using tape.

Since a plurality of items are stored on each card in the system constituting this invention, a computer has to be used as in the systems employing tapes so as to sort internally the different items appearing on each card. However, the system constituting this invention does not have to have the capacity required for the computer which is employed when tapes are used as the storage medium.

By using cards with a plurality of items on each card, the items on the different cards can be sorted into a particular sequence in a minimum amount of time and with a minimum number of passes in comparison to systems using a tape or in comparison to systems using cards with a single item on each card. The information is sorted into the proper sequence in a minimum amount of time because of the particular sequence of operations which constitute a feature of this invention.

In the sequence of operations constituting a feature of this invention, first and second operations are alternately performed on the items to obtain a rearrangement of the items. In the first alternate operations, the different cards become rearranged in accordance with the information represented by a particular item on each card such as the first item on the card. In the second alternate operations, the information on the cards becomes internally rearranged in accordance with the values of the different items on the cards.

In the particular example to be described, the system of the invention may be said to sort 250,000 items with each of these items being represented in binary form by a decimal number having 40 digits. Twenty such items may be stored on each information card so that 12,500 cards are required. As explained above, a computer has to be used with the system constituting this invention in order to sort the different items into the proper sequence. As will become apparent subsequently, the computer requires only a limited capacity such as a capacity for sorting or merging 200 items at any one time.

As a first step, the 12,500 cards required to store the 250,000 items are placed in the input station of a card processing apparatus. Ten cards at a time are withdrawn from the input station and the contents of these cards are read into the computer, which performs an internal sort of the 200 items from each subgroup of ten cards to produce 200 sorted items. The ten cards withdrawn at each time from the input station may be considered as first subgroups. The 200 sorted items in each of the first subgroups are then recorded on 10 new information storage cards with 20 items on each card. The operation of sorting the 200 items on the 10 cards in each successive one of the first subgroups continues until all of the 250,000 items on the 12,500 cards have been processed in this manner.

The resulting 1250 subgroups with 10 information storage cards in each subgroup are divided into 2 sets of 625 subgroups in each set. The cards in each subgroup from the first set are then merged with the cards from a corresponding subgroup in the second set. For example, the 10 cards in the first subgroup of the first set are merged with the 10 cards of the first subgroup of the second set. Similarly, the 10 cards in the second subgroup of the first set are merged with the 10 cards in the second subgroup of the second set. The merging is performed in accordance with the value of a particular item on each card such as the first item on the card so that the values of the first items on the different cards in each merged sequence of 20 cards have progressive values. For example, the 20 cards in each merged sequence may be arranged relative to one another so that the first items on successive ones of the 20 cards increase progressively in value. In this way, 625 sequences are produced with 20 cards in each sequence. Each such sequence of 20 cards may be designated as a "first sequence."

The 625 sequences designated as the first sequences are then divided into 2 sets with 313 of the first sequences in one set and 312 of the first sequences in the other set. Each sequence of 20 cards in the first set is merged with a corresponding sequence of 20 cards in the second set. The merging takes place in accordance with the value of the first item on each card so that second sequences with 40 cards in each of the second sequences are produced. The 40 cards in each of the second sequences are arranged so that the first items on the cards in the sequence have progressive values, such as values of increasing numerical significance. As will be seen, 313 of such second sequences are produced.

The second sequences of 40 cards in each sequence are then divided into 2 sets with 162 of the second sequences in one set and with 161 of the second sequences in the other set. The 40 cards in each of the second sequences in the first set are merged with the 40 cards in a corresponding one of the second sequences from the second set. This merging also takes place on the basis of the value of the first item on each card so that the cards become arranged in an order having progressive values for the first items on the cards. Resultant subgroups of 80 cards in each subgroup are produced. Each subgroup of 80 cards may be designated as a "second subgroup" to distinguish these subgroups from the first subgroups of 10 cards in each subgroup. As will be seen, 162 of the second subgroups are produced with each of the second subgroups having 80 cards. The 80 cards in each of the second subgroups are arranged so that the first items on each of the 80 cards in the subgroups have progressive values.

The 80 cards in each of the second subgroups then have their information internally rearranged by the computer. Since the computer has only a limited capacity such as 200 items, the information from all of the 80 cards in each of the second subgroups cannot be simultaneously processed by the computer. Because of this, the information from a particular number of cards (less than 10) such as the first 8 cards in each second subgroup may be initially introduced to the computer for arrangement. The computer processes the 160 items introduced from these 8 cards to rearrange the 160 items in a desired sequence. Each plurality of 20 sequential items is then recorded from the computer on a new card.

When all of the information transferred from one of the first 8 cards has been processed by the computer and has been recorded from the computer in rearranged form on one or more of the new cards, the information from the next card in the second subgroup being processed at any instant is introduced to the computer for rearrangement with the information still remaining in the computer from the other 7 cards. The information from this next card is processed by the computer so as to be arranged in the proper sequence with the items still remaining in the computer and successive pluralities of 20 sequential items are recorded on other new cards. Upon the transfer back to new cards of all of the information originally in another one of the 8 cards having their information now transferred into the computer, the information in the next card in the subgroup is introduced to the computer for rearrangement with the information retained in the computer from the previous cards in the second subgroup.

In this way, the information in each succeeding card in the second subgroup being processed at any instant becomes sequentially introduced to the computer. The information from each successive card becomes introduced to the computer in this manner when all of the information being processed in the computer from one of the cards having the information transferred to the computer becomes transferred by the computer back to new cards. By proceeding in this manner, the information from a maximum of only 8 cards in the subgroup is being processed and rearranged by the computer at each instant. Because of this, the capacity of 200 items provided for the computer is sufficient even though the computer may be progressively processing 1600 items on the 80 cards in each second subgroups.

When the computer is processing the last 8 cards in each of the second subgroups, the operation of transferring successive cards to the computer becomes temporarily halted. The temporary halt occurs until the information on the last 8 cards in the subgroup being processed at any instant becomes recorded in rearranged form from the computer to new cards. After this transfer from the computer to the cards has occurred, the 160 items of information in the first 8 cards of the next one of the second subgroups become transferred to the computer so that a new processing operation by the computer can be instituted.

The information on the first 8 cards in the next one of the second subgroups is rearranged by the computer, and pluralities of 20 rearranged items become transferred to new cards. Upon each transfer back to new cards of all of the information from one of the cards previously having the information transferred to the computer, the items on the next card in the subgroup become transferred to the computer for rearrangement with the items still remaining in the computer.

By having the computer process information from only a limited number of cards such as 8 cards at each instant, the computer may be provided with a limited capacity. This advantage becomes fully apparent when it is considered that each of the second subgroups contains 80 cards and 1600 items and that each of third subgroups may contain 640 cards and 12,800 items. As will be apparent from the subsequent discussion, fourth subgroups with 5,120 cards and with 102,400 items in each subgroup may be required. Under such circumstances, it would be difficult to construct a computer which would have sufficient capacity to simultaneously receive the information from all of the cards in one of the second, third or fourth subgroups. As previously described, increasing the capacity of the computer is undesirable since it produces material increases in the size of the computer and in the costs of constructing, servicing and maintaining the computer.

After all of the items in each of the second subgroups have been internally rearranged in a manner similar to that described above, the second subgroups become divided into first and second sets with 81 of the second subgroups in each set. The cards in each subgroup of the first set are merged with the cards of a corresponding subgroup in the second set so as to produce fourth sequences of 160 cards in each sequence. The 160 cards in each sequence are arranged so that the first items on the successive cards in the sequence have progressive values. As will be seen, 81 of the fourth sequences are produced.

The fourth sequences of cards are divided into first and second sets so that one set contains 41 of such sequences of the other set contains 40 of such sequences. The cards in each sequence in the first set are then merged with the cards in a corresponding sequence in the second set so that fifth sequences with 320 cards in each sequence are produced. The cards in each of the fifth sequences are arranged on the basis of the values of the first items on the different cards in the sequence. The number of fifth sequences constitutes 41.

The fifth sequences of 320 cards in each sequence are divided into 2 sets with 21 sequences in one set and 20 sequences in the other set. The cards in each sequence of the fifth set are then merged with the cards in a corresponding sequence of the second set so that third subgroups of 640 cards in each subgroup are produced. As will be seen, 21 of the third subgroups are produced. The cards in each of the third subgroups are arranged in accordance with the values of the first items on the different cards so that the successive cards in each subgroup have progressive values for the first items.

Each of the third subgroups of 640 cards is processed by the computer in a manner similar to that described above for the 80 cards in each of the second subgroups. For example, the items on the first 8 cards in each of the third subgroups are initially introduced to the computer for processing by the computer. The computer then operates to obtain a recording of the items on new cards in rearranged form. When all of the items from one of the 8 cards becomes recorded on a new card, the items on the next card in the third subgroup being processed at any instant become transferred to the computer for processing by the computer. The items on successive cards in the subgroup become transferred to the computer for processing when all of the items on a previous card in the subgroup have been transferred from the computer to a new card.

As will be seen from the above discussion, new methods are set forth for processing the information on a plurality of cards to sort the information on the cards into a particular sequence. By these methods, the amount of time and equipment required to sort a plurality of items becomes considerably reduced with respect to equipment now in use, especially when a large number of items has to be sorted. The invention also includes apparatus for automatically processing the cards and the information on the cards in a manner similar to that set forth above. This apparatus is instrumental in sorting all of the information on the different cards and recording the information in proper sequence without requiring that the cards be manually handled or processed at any of the successive steps.

In the drawings:

FIGURE 1 is a top plan view of a simplified card processing apparatus which incorporates reversible feeding-stacking card holding stations and which is capable of recording a plurality of different items on a plurality of information storage cards in the manner described above;

FIGURE 2 is a sectional view substantially on the line 2—2 of FIGURE 1 and shows the constructional details of a rotatale drum included in the embodiment of FIGURE 1 and illustrates the manner in which the drum may be controlled to establish a vacuum pressure at its peripheral surface in order that the information storage cards may be firmly held on that surface for transportation from one station to another in the card processing apparatus;

FIGURE 6 is a top plan view of card processing apparatus which may be included in the invention to merge cards in a pair of subgroups and simultaneously perform a sorting operation on the cards in accordance with a particular item of information on each card;

FIGURE 7 is a circuit diagram, primarily in block form, of an electronic logical control system suitable for controlling the operation of the apparatus and system of FIGURE 6 so as to enable that apparatus properly to perform its card-merging and card-sorting functions;

FIGURE 8 is a circuit diagram, primarily in block form, of a suitable logical control system for use with the apparatus shown in FIGURE 4 to enable that apparatus to perform a further sorting function, as will be described;

FIGURE 9 is a diagram, primarily in block form, of a system for automatically instituting succesive operations of sorting cards into subgroups and then rearranging the different items of information in the cards of each subgroup.

FIGURE 10 is a simplified example illustrating how the information in a plurality of cards becomes rearranged by the apparatus constituting this invention and in accordance with the methods constituting this invention; and FIGURE 11 is a diagram of apparatus for use in conjunction with the apparatus shown in the previous figures to obtain an alternate rearrangement of the cards in each subgroup and a rearrangement of the different items of information on the cards in the subgroup.

Figure 1:
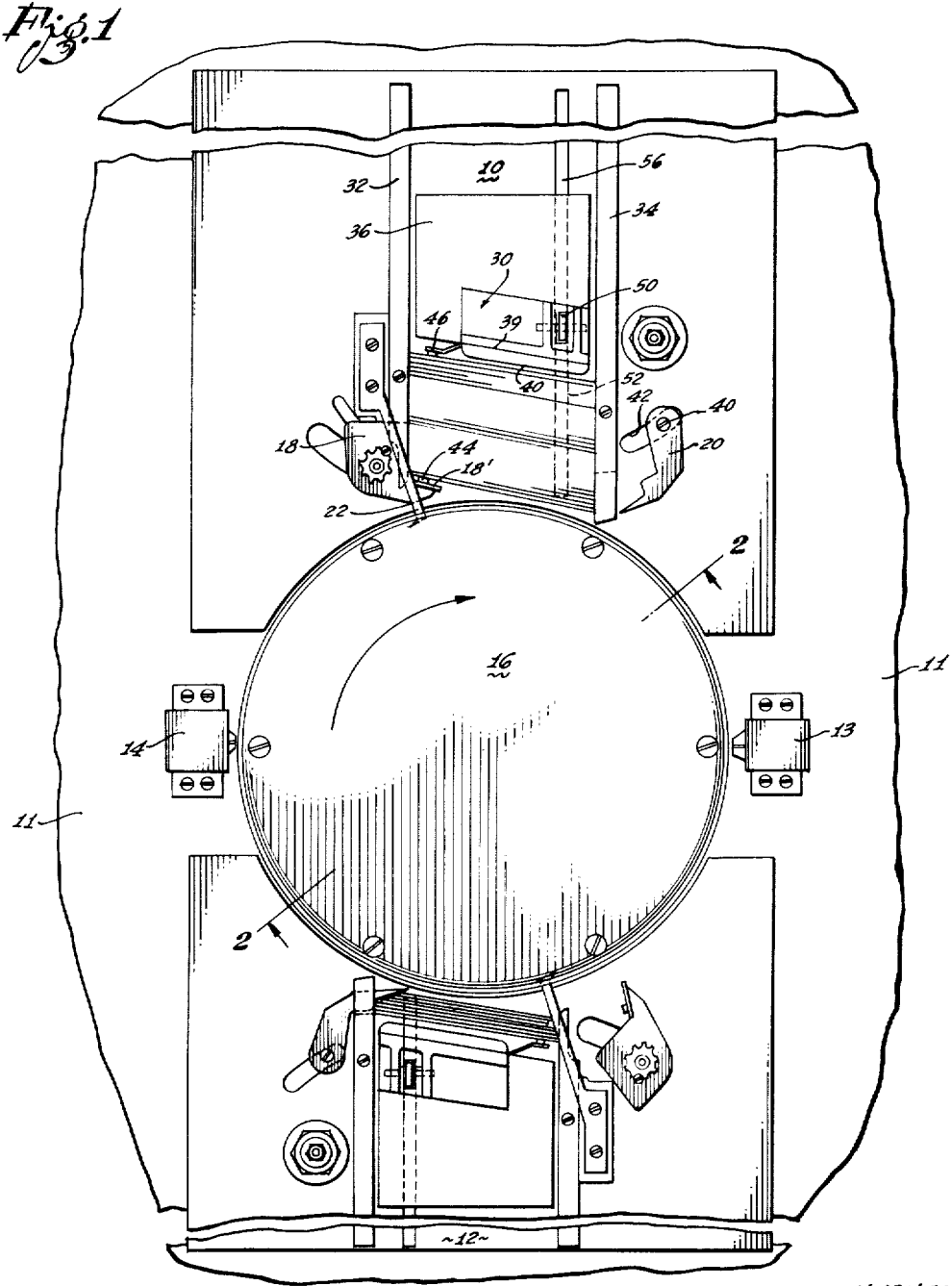

In the apparatus included in this invention, suitable transport means are provided for a plurality of "cards," the term "cards" as used herein being intended to cover any type of discrete elements capable of recording and subsequently reproducing information in digital form. The transport means for the cards such as that shown in FIGURE 1 are preferably movable, although they may also be stationary, as may be seen from copending application Serial No. 731,413, now U.S. Patent No. 2,981,411, filed April 28, 1958. Preferably, the transport means may have the form of rotatable vacuum pressure drums such as a drum 16 in FIGURE 1.

The drum 16 is mounted on a horizontal table top 11 for rotation in a clockwise direction about a vertical axis. The drum is constructed in a manner to be described so that it may exert a vacuum pressure at its peripheral surface. This vacuum pressure enables the drum to firmly retain transported information storage cards at fixed angular positions about its periphery so that these cards may be carried by the drum from one station to another.

The rotatable transport drum illustrated in FIGURE 1, and which will be described subsequently, represents merely one means by which the cards can be transported from one station to another. It will be appreciated that other means may also be used within the concept of the invention.

A first card holding station 10 is mounted on the table top 11 with its mouth adjacent the peripheral edge of the transport drum 16. A second card holding station 12 is also mounted on the table top 11 diametrically opposite to the card holding station 10. The card holding station 12 also has its mouth disposed adjacent the transport drum 16.

A first transducer means 13 is mounted on the table top 11, and this transducer means is positioned between the card holding stations 10 and 12. A second transducer means 14 may also be mounted on the table top 11, and the second transducer means is shown as being on the opposite side of the transport drum 16 from the transducer means 13.

The transducer means 13 and 14 may be any suitable and well known type of electromagnetic transducer head or plurality of heads. For example, these transducer means may be constructed in a manner similar to that described in copending application Serial No. 550,296, now U.S. Patent No. 3,032,750, filed December 1, 1956, by Alfred M. Nelson et al. The transducer means, of course, may be any other suitable type of electromagnetic transducer when cards having magnetic recordings are used. Moreover, when other types of recordings are used on the information cards, these transducer means may, for example, be of the mechanical or photo-electric type.

The card holding station 10 has a vacuum-pressure feed head 18 movably mounted adjacent its leading wall 32 with respect to the rotation of the transport drum 16. The card holding station also includes a stack head 20 which is movably mounted adjacent the trailing wall 34 of the station. The construction and operation of the feed head 18 and of the stack head 20 may be similar to that described and claimed in copending application Serial No. 645,639, now U.S. Patent No. 2,969,979 which was filed March 12, 1957 in the name of Alfred M. Nelson et al.

It is believed unnecessary to include a detailed description of the constructional details of the feed head 18 and the manner in which the feed head and stack head are moved between their operative and stand-by positions. It should be pointed out, however, that the feed head 18 is controlled to exert a vacuum pressure at its card engaging surface 18' when the card holding station 10 is in its feeding mode. When the station is in its feeding mode, the feed head 18 is moved forward to its operative position in which it extends partially across the mouth of the card holding station. This vacuum pressure is exerted on the trailing portion of the front face of the leading card in the card holding station. The leading portion of the front face of this card rests on the peripheral edge of the drum 16, and the drum also exerts a vacuum force on the card. The stack head 20 at this time is withdrawn to its stand-by position.

The vacuum force exerted by the drum 16 tends to withdraw the leading card from the card holding station 10, whereas the vacuum force exerted on the card by the card engaging surface 18' of the feed head 18 tends to retain the card in the card holding station. The vacuum force exerted by the feed head 18 is made the greater of the two, so that this vacuum force is able to overcome the vacuum force exerted on the card by the drum 16. So long as the leading card is held in this manner in the card holding station 10, the other cards supported in stacked relationship in the station behind the leading card are also held in place in the station. The cards are so held in a generally stacked relationship in the station with their lower edges resting on the surface of the table top.

Whenever the vacuum pressure to the card engaging surface 18' of the feed head 18 is momentarily interrupted, the leading card in the card holding station 10 is withdrawn by the transport drum 16. The trailing wall 34 of the card holding station forms a throat with the periphery of the drum 16. The width of this throat is such that one card at a time only can be passed from the card holding station to the transport drum 16 upon the interruption of the vacuum pressure at the feed head 18. The interval of the operation in the vacuum pressure to the feed head 18 may be conveniently such that only one card is released from the card holding station to the drum 16. The next card in the station now comes to the leading position, and this subsequent card may then be retained in the station by the feed head 18 until the next interruption of its vacuum pressure.

In the stacking operational mode of the card holding station 10, the feed head 18 is withdrawn to a stand-by position and its vacuum pressure is turned off in the manner explained in copending application Serial No. 645,639 referred to above. Simultaneously, the stack head 20 is moved to its operative position at which it fills the throat between the wall 34 and the periphery of the drum 16. The stack head has a pair of fingers 20' (FIGURE 3) which enter annular peripheral grooves in the transport drum 16, and any cards transported to the mouth of the station 10 are engaged by the fingers and are arrested by the stack head.

Figure 3:
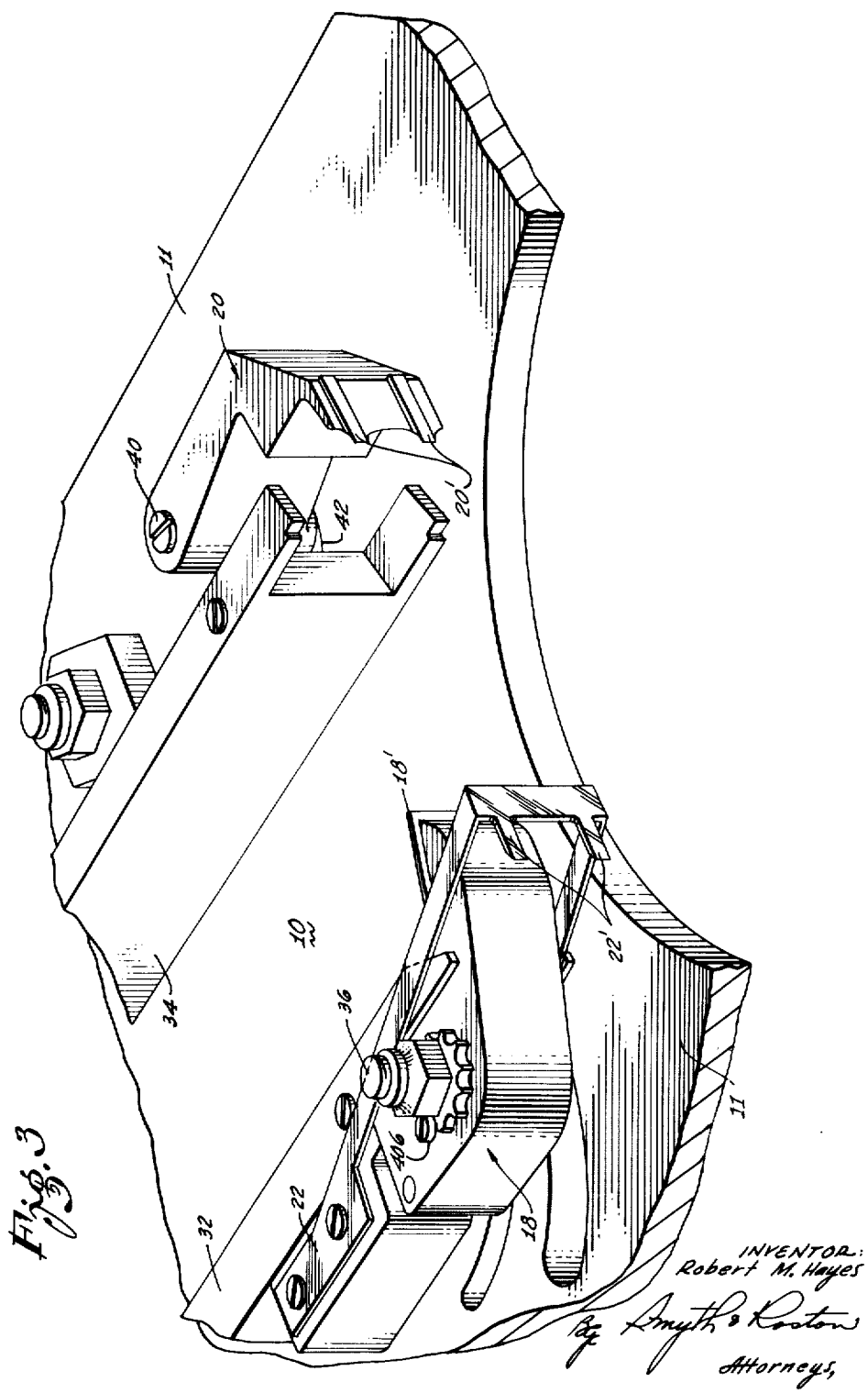
FIGURE 3 is an enlarged persective view, as compared with FIGURE 1, of a reversible card holding station included in the embodiment of FIGURE 1, this view also illustrating more clearly the details of a transfer mechanism incorporated in the card holding station.

A pick-off member 22 is mounted adjacent the leading wall 32 of the card holding station 10. This pick-off also has a pair of fingers 22' which extend into the peripheral channels or grooves which are formed around the drum 16. The pick-off has arcuate fingers 22' which are shown in FIGURE 3 and which have intermediate portions displaced radially outwardly from the periphery of the drum 16. This configuration of the fingers of the pick-off causes the cards transported by the drum to ride up over its fingers and be lifted outwardly from the periphery of the drum. Then, as each card is arrested by the stack head 20, its trailing edge projects tangentially to the periphery of the drum and over the fingers of the pick-off 22. The next succeeding card transported by the drum will then ride over the fingers of the pick-off 22 and under the preceding card, in a manner so as to pry the preceding card from the periphery of the drum. The succeeding card is then arrested by the stack head 20 and the preceding card is deposited in the card holding station 10. In this manner, the card holding station is conditioned to its stacking mode in which cards transported by the drum 16 to the stack head are deposited in the station.

The card holding station 12 may be constructed in a manner similar to the construction of the card holding station 10, and for that reason its components are not numbered in FIGURE 1 and will not be individually described. As mentioned previously, the card holding station 10 is illustrated in FIGURE 1 in its feeding mode in which the feed head 18 is moved forward to an operational position and the stack head 20 is withdrawn to a stand-by position. The card holding station 12, on the other hand, is illustrated as being in a stacking mode in which its stack head is moved forward to an operative position and its feed head is withdrawn to a stand-by position.

The feed head and stack head of the card holding stations 10 and 12 may be operated by an appropriate system of cams and levers. The actual operation of these heads is fully described in the copending application Serial No. 645,639 referred to above. Since the actual mechanical control of the movements of the stack head and the feed head for each station does not form a part of the present invention, such a control will not be described in detail here.

The card holding station 10 in its feeding mode of operation may contain a group of information storage cards supported in the station in an upright stacked manner. In the feeding mode, the station 10 is conditioned to controllably feed the cards in a one-by-one sequence to the periphery of the transport drum 16. The card holding station 12 at this time is in its stacking mode so that cards transported to its stack head are deposited in that station. The cards from the card holding station 10 may now be controllably fed to the periphery of the transport drum 16 and transported by that drum past the transducer 13 for processing.

The transducer operates initially in accordance with the present invention to record a plurality of unsorted items on each of a plurality of information storage cards. As mentioned above, this recording may conveniently proceed on the basis of different binary numbers representing different items, and with a selected sequence of the binary numbers representing a desired order of the items.

As also mentionen above, the items are recorded on the cards by means of the transducer means, which provides electrical signals which correspond to the binary numbers representing the different items. These signals are caused to magnetize a multiplicity of discrete magnetic areas on each card. These magnetic areas are magnetized with one polarity for a binary one and with the opposite polarity for a binary zero. The magnetic areas, as mentioned, will be arranged in a plurality of rows and columns, and each column or set of columns may represent different binary numbers corresponding to the different items recorded on the particular card.

A pusher member 30 is included in the card holding station 10, and a similar pusher member is included in the card holding station 12. The pusher member 30 is adapted to move along the floor of the card holding station 10 between its spaced parallel walls 32 and 34. These walls are spaced apart a distance corresponding essentially to the length of each card supported in the station 10.

The purpose of the pusher member 30 is to maintain the cards in stacked relation in the card holding station. To accomplish this purpose, the pusher member is biased in the direction of the mouth of the station to resiliently urge the cards forward in the station. The cards are urged forward in the station so that the leading card may rest against the card-engaging surface 18' of the feed head 18 and against the peripheral surface of the drum 16 when the station is in its feeding mode. The cards are also urged forward in the station so that the leading card will rest against the stack head 20 and against the pick-off 22 and the peripheral surface of the drum 16 when the station is in its stacking mode.

The pusher member 30 maintains the cards in a closely stacked condition, as noted above. As the cards are fed out of the card holding station, the pusher member 30 moves forwardly to exert a continuous pressure on the remaining cards and to hold these cards in a stacked relationship in the station. Alternately, when cards are fed into the card holding station 10, the pusher member 30 is moved backwardly against its spring pressure so that it still exerts a force on the cards in the station to maintain them in a stacked relationship.

The pusher member 30 may be constructed in a manner described in detail in copending application Serial No. 641,752 which was filed February 21, 1957, in the name of Alfred E. Gray et al. As fully described in that application, the pusher includes a bracket 39 which is secured to a base plate 36, the base plate being adapted to slide back and forth along the floor of the card holding station.

A suitable resilient pad 40 (FIGURE 1) is mounted on the front of the bracket 39, and this pad engages the cards in the station and serves as a shock absorber. The bracket 39 carries a switch armature 46 which engages a pair of switching contacts 44 on the feed head 18 when the last card is fed from the station to the periphery of the drum 16. This engagement of the switch armature with its switching contacts facilitates the electrical control of the movements of the feed heads and stack heads of the stations, as described more fully in copending application Serial No. 645,639 referred to above.

The bracket 39 of the pusher 30 also supports a rotatable member 50 (FIGURE 1) which extends into a slot in the base plate 36. A resilient spring strip 52 extends upwardly through a slot 56 in the table top 11 and around the rotatable member 50. This resilient strip has a tendency to coil itself into a coiled configuration, and in so doing it causes the rotatable member 50 to rotate and resiliently biases the pusher member 30 toward the mouth of the station. In this manner, and by this means, the information storage cards in the card holding station are continually biased toward the mouth of the station and are held in a stacked condition.

Figure 2:
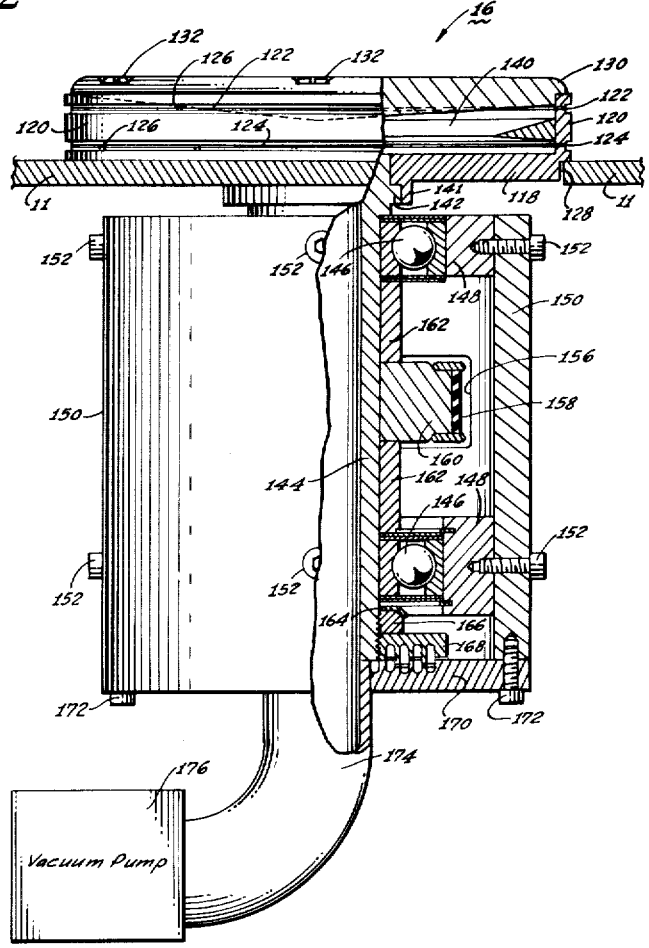

Details of the vacuum transport drum 16 are shown in FIGURE 2. The illustrated drum is similar in its construction to the rotatable transporting drum disclosed and claimed in copending application Serial No. 600,975 now U.S. Patent No. 2,883,189, July 30, 1956, in the name of Loren R. Wilson.

As shown in FIGURE 2, the vacuum transport drum 16 is composed of a lower section and an upper section. The lower section includes a disc-like bottom portion 118 and an annular side portion 120. The disc-like bottom portion and the annular side portions are integral with one another.

A pair of axially spaced peripheral orifices 122 and 124 extend through the side portion 120. Each of these orifices is discontinuous in that it is interrupted at selected intervals about its angular length by ribs 126. The ribs are integral with the side portion 120. The orifices 122 and 124 each has an external peripheral annular channel for receiving the fingers 20' of the stack head 20 and the fingers 22' of the pick-off 22. As noted above, this engagement of the fingers 20' of the stack head 20, and of the fingers 22' of the pick-off 22, with the annular channels in the drum permits the cards to be removed from the periphery of the drum and deposited in the station 10 or in the station 12 in the described manner depending upon which of these stations is in a stacking mode.

The disc-like bottom portion 118 of the lower section of the drum is undercut as shown at 128. This enables the table top 11 to extend beyond the outer limits of the side portion 120. Therefore, even without excessively close tolerances between the edge of the table top 11 and the rotating surface of the drum 16, the cards supported endwise on the table top in the card holding stations 10 and 12 have no tendency to slip down between the table and the drum as these cards are transferred to and from the periphery of the drum. There is, therefore, no tendency for the cards to become misplaced or damaged.

The upper section of the drum 16 is in the form of a disc-like member 130 which engages the annular side portion 120 of the lower section. The member 130 forms an enclosure with the lower section of the drum, with the member 130 being positioned parallel to the disc-shaped bottom portion 118 of the lower section. The member 130 is held in place on this annular side portion 120 by a plurality of screws 132.

A deflector ring 140 is supported within the interior of the drum 16 in press fit with the inner surface of the annular side portion 120. This deflector ring is tapered towards the center of the drum to prevent turbulence and to provide a streamlined path for air that is drawn in through the peripheral orifices 122 and 124.

The bottom portion 118 of the lower section of the drum 16 contains a central opening which is surrounded by an annular collar 141. The collar 141 surrounds a shoulder 142 which is provided at one end of a hollow shaft 144. The drum 16 is supported on the shoulder 142, and the end of the shaft 144 extends into the opening in the bottom portion 118 in friction fit with that portion. Therefore, rotation of the hollow shaft 144 causes the drum 16 to rotate. Also, the interior of the hollow shaft 144 communicates with the interior of the drum.

A pair of bearings 146 are provided at opposite ends of the shaft 144. The inner races of these bearings are mounted on the shaft, and their outer races are held by bushings 148. These bushings are secured to a housing 150 by means of a plurality of screws 152. An arcuate opening 156 is provided in the housing 150 between the bearings 146. This opening enables a drive belt 158 to extend into the housing and around a pulley 160. The pulley 160 is keyed to the shaft 144 between the bearings 146, and it is held against axial movement by a pair of sleeves 162 which are supported on the shaft between the bearings 146. In this way, the shaft 144 and the drum 16 can be rotated by a suitable motor (not shown), the motor being mechanically coupled to the pulley 160 by the drive belt 158.

The bearings 146 and the sleeves 162 are held on the shaft 144 by a nut 166. This nut is screwed on a threaded portion at the lower end of the shaft, and a lock washer 164 is interposed between it and the lower bearing 146. A sealing disc 168 is also screwed on the threaded portion at the lower end of the shaft 144. The sealing disc 168 operates in conjunction with a bottom plate 170 to tend to prevent the movement of air between the interior of the housing 150 and the interior of the hollow shaft 144 when pressure differential exists between the housing and the shaft.

The bottom plate 170 is mounted to the housing 150 by a plurality of screws 172, and this plate serves to close the lower end of the housing. A circular central opening is provided in the bottom plate 170, and a hollow conduit 174 extends into the opening in friction fit with the plate 170. The conduit 174 is axially aligned with the hollow shaft 144 so that air may be exhausted by a vacuum pump 176 from the hollow interiors of the shaft and the conduit. The vacuum pump 176 may be of any suitable known construction and, for that reason, is shown merely in block form.

The vacuum pump 176 draws air in through the orifices 122 and 124, through the interior of the drum 16, down the shaft 144 and through the conduit 174. This creates a vacuum pressure at the outer peripheral surface of the annular portion 120 of the lower section of the drum. This vacuum pressure serves to firmly retain the cards from the card holding stations 10 and 12 on the peripheral surface of the drum as such cards are transported by the drum between these two stations.

As mentioned above, the apparatus of FIGURES 1–3 may be used for recording binary data corresponding to a plurality of different items on a plurality of information storage cards. The cards may first be placed in the station 10 which functions as an input means, and they may then be released in sequence to the rotatable vacuum pressure transport drum 16. The transport drum then carries the cards past the transducer means 13 which now operates as a write head. This transducing means causes a plurality of the items to be recorded on each of the cards. After this recording, the cards are carried by the drum 16 to the output, or receiving, station 12 and deposited in that station. The station 12, at the end of this operation, contains a plurality of information storage cards, each bearing binary data corresponding to a selected plurality of unsorted items.

Figure 4:
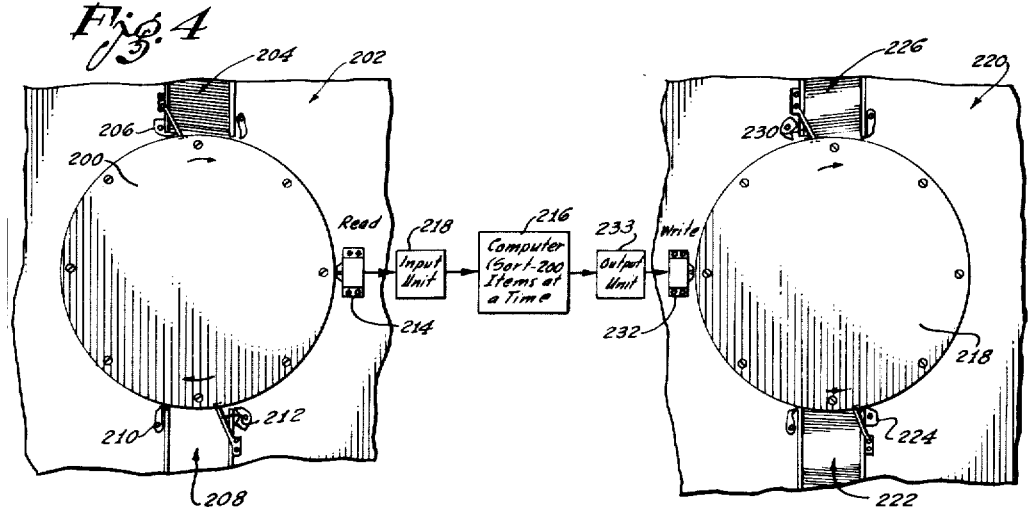
FIGURE 4 is a schematic diagram, partly in block form, of card processing apparatus for realizing the objectives of the present invention, which apparatus includes computer means for performing certain sorting functions on items stored on a plurality of information storage cards processed by the apparatus.

As mentioned above, the cards from the station 12 are used in the system of the invention as shown in FIGURE 4, so that the data on groups of the cards may be sorted and rewritten on other cards in a particular order to provide a plurality of subgroups, with each subgroup having a selected number of cards bearing sorted items on each card.

The apparatus for carrying out the above operation is shown in FIGURE 4. This apparatus may include, for example, a vacuum transport drum 200 which is rotatable on a table top 202. The drum 200 may be similar to the drum 16 described in conjunction with FIGURE 2. A first card holding station 204 is positioned on the table top 202 with its mouth adjacent the drum 200. This card holding station is similar in its construction to the card holding station 10. It will be understood that a vacuum pressure is introduced to the feed head 206 of the station 204 and that this vacuum pressure enables the feed head to hold the information cards in the station 204. Whenever that vacuum pressure is interrupted, a card is released from the station 204 to the periphery of the transport drum 200.

A second card holding station 208 is also positioned on the table top 202 with its mouth adjacent the periphery of the drum 200. This latter station may be constructed to perform as an output station, or stacking station, and it may include a stack head 210. The stack head 210 may be similar to the stack head 20 described above. The station 208 may also have a pick-off member 212 positioned adjacent its leading wall, and this pick-off member may be similar to the pick-off member 22 described in conjunction with FIGURES 1 and 3.

Transducer means 214 are positioned on the table top 202 adjacent the periphery of the drum 200. The transducer means 214 may be similar to the transducer means 13 described above and may comprise a plurality of electromagnetic read heads. The read heads serve in the transducer means 214 to read the data on the cards transported by the drum 200 from the station 204 to the station 208.

The apparatus and system of FIGURE 4 includes a computer 216. This computer may be constructed in known manner and for that reason is shown merely in block form. The computer, for example, may be of the 705 type presently marketed by the International Business Machines Corporation. The computer 216 is used to merge the various items recorded on the information cards, as referred to above, so as to provide a desired sorted condition of the items and to place the items in a predetermined sequence.

An input unit 218 is interposed between the read head 214 and the computer. This input unit may be of any well known type; for example, it may be a magnetic tape arrangement. Such arrangements are well known and are used to hold the input to the computer and to supply appropriate data to the computer corresponding to the input.

The apparatus of FIGURE 4 is shown as also including a rotatable vacuum transport drum 218 which is rotatably mounted on table top 220. The drum 218 also may be similar to the drum 16 described in detail in FIGURE 2. A second input station 222 is positioned on the table top 220 with its mouth adjacent the periphery of the drum 218. This station may be similar to the input station 204, and it has a feed head 224 positioned adjacent its leading wall for controlling the feed of cards from the input station to the periphery of the drum 218. An output or stacking station 226 is also mounted on the table top 220, and this latter station has its mouth positioned adjacent the periphery of the drum 218. The station 226 may be similar to the stacking station 208, and it has a stack head 228 positioned adjacent its trailing wall, and it also has a pick-off member 230 positioned adjacent its leading wall.

A transducer means 232 is mounted on the table top 220 and is positioned between the stations 222 and 226. This latter transducer means may comprise a plurality of write heads, and they are used to record binary data on cards from the input station 222, as such cards are carried by the transport drum 218 past the transducer 232.

An output unit 233 is interposed between the computer 216 and the write heads 232. This output unit may be of any known type, and it serves to hold the output signals from the computer and to convert such output signals into signals apropriate for application to the write head 232.

Figure 5:
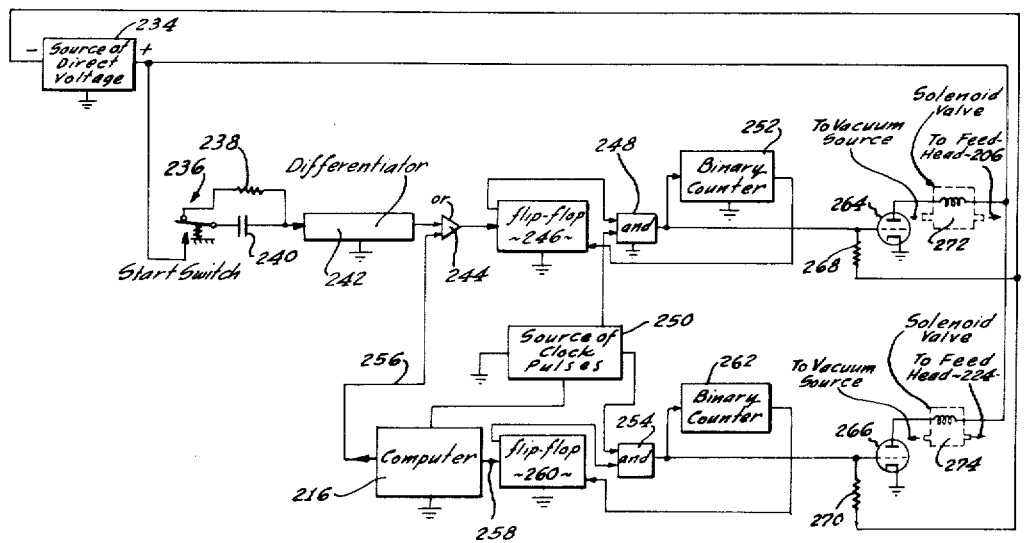
FIGURE 5 is a circuit diagram, primarily in block form, of a logical control system for use in conjunction with the system of FIGURE 4 to control the operation of that system.

The apparatus and system of FIGURE 4 may be controlled by the logic control system of FIGURE 5. This control system includes a source 234 of direct voltage, the source having a positive terminal, a negative terminal and a grounded common terminal. The positive terminal of the source 234 is connected to a normally open fixed contact of a single-pole, double-throw push-button type start switch 236. The armature of this switch is normally biased into engagement with a normally closed fixed contact which, in turn, connects with a resistor 238. The armature of the start switch is connected to a capacitor 240. The capacitor and resistor are both connected to a differentiator circuit 242. The differentiator may be of any known type of electrical differentiator circuit and it serves essentially to sharpen pulses passed through it.

One output terminal of the differentiator 242 is connected to an input terminal of an "or" network 244. The output terminal of the "or" network is connected to the left input terminal of a flip-flop 246. The left output terminal of the flip-flop 246 is connected to an "and" network 248, as is a source 250 of clock pulses. The output terminal of the "and" network 248 is connected to a binary counter 252, and the binary counter is connected to the right input terminal of the flip-flop 246. The source 250 of clock pulse is also connected to the computer 216 to supply clock pulses to the computer, and this source connects with an "and" network 254.

It will be remembered that the first operation of the computer in carrying out the present invention is to sort the contents of first subgroups of cards read into the computer. In the particular example, ten cards are used for each of the first subgroups, and the computer serves to sort the contents of the ten cards to provide a sequence of two hundred items.

When the sort has been completed in the particular example under discussion and the two hundred items have been read out of the computer in their proper sequence, the computer develops a signal on a lead 256 to indicate that it is ready for the contents of a new subgroup of ten cards. This lead is connected back to the "or" network 244. Likewise, whenever the computer has merged into the desired order the contents of one of the first subgroups read into it, it develops a signal on a lead 258. This latter lead is connected to the left input terminal of a flip-flop 260. The computer develops this latter signal on the lead 258 a timed interval before it actually begins to read out the data corresponding to the sorted items from its output unit 234.

The production of signals by the computer 216 on the leads 256 and 258 to indicate the completion of a sorting operation is well understood in the computer art. For that reason, the internal connections of the computer itself will not be described in detail here.

The left output terminal of the flip-flop 260 is connected to the "and" network 254, and the "and" network is connected to a second binary counter 262. The output terminal of the latter binary counter is connected to the right input terminal of the flip-flop 260.

The "and" networks 248 and 254 in themselves are well known to the computer art. These networks are constructed usually to include transistors or diodes, and they function to pass a signal to a single output terminal only when a plurality of signals are simultaneously applied to all its input terminals. The "or" type of gate network 244 is also well known in the electronic computer art. This latter network also includes usually diodes or transistors, and it serves to pass an input signal applied to any of its input terminals to its output terminal. Binary counters such as the counters 252 and 262 are also well known. These counters serve to provide an output pulse in response to a predetermined number of input pulses.

In performing the particular example of the invention, in which the contents of first subgroups of ten cards in each subgroup are fed to the computer, the binary counters 252 and 262 are constructed to provide an output pulse in response to each plurality of ten input pulses. The clock pulse source 250 is a stable frequency oscillator which provides regularly timed output pulses for timing the operation of the system.

The "and" network 248 is also connected to the control grid of a triode 264, and the "and" network 254 is connected to the control grid of a triode 266. The cathodes of both these triodes are grounded, and their control grids are connected to respective resistors 268 and 270 which, in turn, are connected to the negative terminal of the direct voltage source. The anode of the triode 264 is connected to the energizing winding of a solenoid valve 272 which is included in the vacuum feed line to the feed head 206 associated with the station 204 in FIGURE 4. The triode 264 is normally held non-conductive by the connection of the resistor 268 to a negative voltage bias-ing source. However, whenever the "and" network 248 passes an output pulse, the triode 264 is momentarily rendered conductive. This causes a current pulse to flow through the solenoid valve 272 which momentarily closes the valve to interrupt the vacuum pressure at the card engaging surface of the feed head 206 to release a card from the station 204.

The anode of the triode 266 is connected to the energizing winding of a solenoid valve 274 in the vacuum feed line to the feed head 224 associated with the card holder station 222. The energizing coils of the solenoid valves 272 and 274 are both connected to the positive terminal of the source of direct voltage 234 to complete the energizing circuit.

The triode 266, likewise, is normally held non-conductive by the connection of the resistor 270 to the negative terminal of the source 234. However, each time the "and" network 254 passes a pulse, the triode 266 momentarily becomes conductive to cause a card to be released from the station 222.

To initiate the operation of the system, the start switch 236 is depressed and released. This momentarily disconnects the capacitor 240 from its shunting discharge resistor 238 and connects that capacitor to the positive terminal of the source 234. The resulting flow of charging current into the capacitor, causes an input pulse to be introduced to the differentiator 242. The differentiator responds to that pulse to produce a sharp pulse at its output terminal, and this latter pulse is passed by the "or" network 244 to the flip-flop 246 to trigger that flip-flop to its true state. This triggering of the flip-flop causes a relatively high voltage to appear at its left output terminal which conditions the "and" network 248 for conduction.

The next clock pulse from the source of clock pulses 250 is passed by the "and" network 248 to the binary counter 252 and to the control grid of the triode 264. For each clock pulse passed by the "and" network 248, a card is released by the input station 204. The contents of each released card are read by the read heads 214 and introduced to the input unit 218. This continues until the contents of ten cards (in the particular example) are read into the input unit. At that time, the binary counter 252 develops an output pulse which returns the flip-flop 246 to its false state. The "and" network 248 is now no longer conditioned to pass the clock pulses to the triode 264 and no more cards are released at present from the input station 204.

In accordance with well known computer operations, the input unit now feeds its contents into the computer 216. As noted previously, in the particular example, the contents so fed to the computer represent two hundred separate items of information, and this in turn constitutes the assumed capacity of the computer in the particular example under consideration. The computer sorts these items in known manner and places them in the desired sequence, and then binary data corresponding to this sequence is introduced to the output unit 234. When this occurs, a control signal appears on the output lead 258 and triggers the flip-flop 260 to a true state. This conditions the "and" network 254 for conduction, so that the clock pulses from the source 250 may be passed to the triode 266.

The resulting current pulses through the triode 266 cause cards to be successively released from the input station 222. The timing of the signal on the lead 258 is properly related with the reading out of the contents of the output unit 234 so that each card released from the station 222 is in proper position at the write heads 232 to have the contents recorded at the proper positions from the computer 216. These latter information storage cards are carried by the transport drum 218 to the output station 226. As a result of the first operation in the particular example, ten cards appear in the output station 226, each of these cards having twenty items recorded on it, and the contents of all the items on all the cards being in a predetermined sequence.

The computer now develops a control signal on the lead 256 which triggers the flip-flop 246 to its true state. This permits a successive subgroup of ten cards to be fed from the input station 240 and read in sequence by the read head 214. These cards, after being processed by the read head 214, in a manner similar to that described previously, are then carried by the drum 200 to the output station 208 to be stacked in that station.

The computer 216 in a manner similar to its operation on the first group of cards then sorts into a particular sequence the two hundred unsorted items from the cards in the next one of the first subgroups, and ten more cards from the following one of the first subgroups are released from the station 222 to receive the sorted items. These operations continue until the station 204 is empty. When that occurs, the resulting engagement of a switch activator corresponding to the switch actuator 46 of FIGURE 1 with studs corresponding to the studs 44 on the feed head 18 may operate a suitable stop switch to stop the operation of the system.

There are now, therefore, a plurality of information storage cards in the station 226. In the particular example, each of these cards contains twenty items arranged on each card, and further, all the cards in the output station 226 are arranged in first subgroups of ten cards in each subgroup. All of the 200 items in each subgroup appear on the successive cards of the subgroup in a properly sorted order. However, the items appearing in each of the first subgroups are not necessarily arranged properly with respect to the items in the other ones of the first subgroups. Because of this, further sorting operations may be necessary, as will be described in detail subsequently.

Cards in the station 226 are placed in a card processing collator, and they are partially merged to provide a plurality of groups of sequences, with the cards in any particular group being arranged in order with respect, for example, to the first item on each card. Such a merging operation may be carried out by the apparatus shown in FIGURE 6, and under the control of the logical circuitry of FIGURE 7. The apparatus of FIGURE 6, and the logical control circuitry of FIGURE 7 may be similar to that described and claimed in copending application Serial No. 703,080, which was filed December 16, 1957, in the name of Jerome B. Wiener.

The apparatus of FIGURE 6 includes a suitable transport means, either stationary or movable, such as a rotatable vacuum pressure transporting drum 276. This drum may be similar in its construction to the vacuum transport drum 16 described in FIGURE 2. The drum 276 may be rotatably mounted on a suitable horizontal table top 277, and the drum is considered as being rotatable in a counterclockwise direction. A second horizontal rotatable vacuum pressure transporting drum 278 may also be rotatably mounted on the table top 277 in a uniplanar relationship with the drum 276. Likewise, a third or common rotatable vacuum pressre drum 279 is mounted on the table top 277 to be adjacent both the drums 276 and 278 in uniplanar relation with those drums. The drum 278 is rotatable in a counterclockwise direction, and the drum 279 is rotatable in a clockwise direction.

A first gate transfer mechanism 280 is mounted on the table top 277, and this gate transfer mechanism is disposed between the drums 276 and 279 adjacent the contiguous point of these two drums. The gate transfer mechanism 280 may be similar to the one described in copending application Serial No. 562,154 which was filed January 30, 1956, in the name of Stuart L. Peck et al. The gate transfer mechanism is constructed to emit streams of air in a tangential direction relative to the periphery of the drum 276. These streams of air cause a card transported on the periphery of the drum 276 and coming under their influence to be stripped from the drum 276 and transferred to the peripheral surface of the drum 279.

A similar gate transfer mechanism 282 is mounted on the table top 277, and this latter gate transfer mechanism is positioned to direct streams of air in a direction tangential relative to the periphery of the drum 278. In the same manner as the streams from the gate 280, the streams of air from the gate 282 effectuate the transfer of cards coming under their influence from the drum 278 to the drum 279. Both the gate transfer mechanisms 280 and 282 may be continuously activated when the apparatus is in operation.

A first input station 283 is positioned on the table top 277 with its mouth adjacent the periphery of the drum 276. This input station is constructed to hold the information cards in a stacked condition with the lower edges of the cards resting on the table top 277. It may be constructed in a manner similar to the station 10 of FIGURE 1. The release of the leading card from the station is controlled by a feed head 284 of the type described above, and a solenoid-actuated valve 285 is interposed in the vacuum pressure lead to the feed head 284. This valve may be controlled to interrupt the vacuum pressure to the feed head and cause a card to be released from the station 283 to the periphery of the drum 276.

A plurality of transducer heads represented by the transducer means 286 are mounted on the table top 277 and positioned adjacent the trailing wall of the station 283 with respect to the rotation of the drum 10. A card hold station 287 is also mounted on the table top 277, and the card hold station is positioned adjacent the periphery of the drum 10. The card holding station may be similar in its construction to the station described and claimed in copending application Serial No. 689,347 filed October 10, 1957, in the name of Eric Azari et al.

The cards transported by the drum 276 are caused to be transferred from the drum to the hold station 287 for movement along the surface of the hold station. A vacuum pressure is supplied to the hold station so that a card passing over it may be stopped and retained against a return from the hold station back to the drum 276. A solenoid-actuated valve 288 is interposed in the vacuum pressure feed line to the hold station 287. This valve can be controlled to interrupt the vacuum pressure to the hold station and thereby control the hold or release of cards carried to the hold station by the transport drum 276.

An input station 289, similar to the input station 283, is positioned on the table top 277 with its mouth adjacent the periphery of the drum 278. A series of transducer heads, which are represented by the transducer means 290, are positioned adjacent the trailing wall of the input station 289. A card hold station 291 is positioned on the table top 277, and this card hold station is displaced from the trailing wall of the station 289. The hold station 291 may be constructed in a manner similar to the construction of the hold station 287. A solenoid-actuated value 293 is interposed in the line coupling the hold station 291 to a suitable vacuum pressure source (not shown).

A controllable vacuum pressure feed head 292, which may be similar in its construction to the feed head 284, is mounted on the table top 277. The feed head 292 extends through the leading wall of the input station 32 partially across the mouth of the station. In a manner similar to the operation of the feed head 284, the feed head 292 controls the release of cards from the input station 289. A solenoid-actuated valve 294 is mounted in the line coupling the feed head 292 to a suitable vacuum pressure source.

A receiving or output station 295 is mounted on the table top 277 with its mouth adjacent the periphery of the drum 14. This receiving station may be similar to the stacking station 12 of FIGURE 1. The receiving station includes a stack head 296 which is disposed adjacent its trailing wall, and it includes a pick-off 297 mounted adjacent its leading wall. The pick-off 297 may be similar to the pick-off 22 of FIGURE 1, and the stack head 296 may be similar to the stack head 20 of FIGURE 1. The operation of the stack head 296 may be controlled by a solenoid-actuated valve 298.

In a manner to be described, the cards from the output station 226 of FIGURE 4 are separated into two stacks, one stack being placed in the input station 283 and the other in the input station 289. These cards are to be merged into the receiving station 295, and a single stack is received in the receiving station for each pass, the received stack containing second subgroups of cards with each of the second subgroups containing a sequence from the input station 283 merged with a sequence from the station 289 to provide a sorted progression of the first item on each card. These passes are continued until each subgroup of sorted cards in the output station 295 contains eight of the first subgroups in the particular example. As previously described in connection with the embodiment shown in FIGURE 4, each of the first subgroups contained ten cards. Because of this, each of the second subgroups contains eighty cards.

After the stacks of cards have been placed in the input stations 283 and 289, the feed heads 284 and 292 are both momentarily de-activated so that one card is released from each station. The released cards are read by the transducer means 286 and 290 respectively, and the hold stations 287 and 291 are selectively controlled (as will be described) so that one or the other of the cards passes its hold station and the other is held by its hold station. If the card released by its hold station is the one on the drum 278, this card is transferred by its gate 282 to the drum 279. Conversely, if the card released by its hold station is on the drum 276, this card is transferred by the gate 280 to the drum 279. In either event, the card transferred to the drum 279 is carried to the output station 295 to be deposited in that station.

Whenever a card is released from the hold station 287 or from the hold station 291, a new card is released from the corresponding input station 283 or 289. For the merging process, each card from the input station 283, for example, is held at the hold station 287, and cards from the input station 289 are sequentially released and deposited in the proper sequence in the output station 295. This sequence, of course, is with respect to a particular binary data on each card such as the first item on the card. This operation continues until the ascending progression, for example, of binary data within the control area on successive cards from the input station 289 equals or exceeds the binary data on the held card at the hold station 287.

When the value of the control area on a card, such as the first item on a card, equals or exceeds the data in the control area of the card held by the hold station 287 such as the first item on the card, the release of cards from the hold station 290 and from the input station 289 is immediately stopped. Cards are then released from the hold station 287, and thereafter in sequence from the input station 283, until the binary data in the control area on the card held by the hold station 291 again drops below the data in the control area on the respective cards sequentially released from the input station 283. When this occurs, the release of cards from the hold station 287 is immediately stopped. The hold station 291 then releases its card to the transport drum, and thereafter the input station 289 begins sequentially to release its cards.

In this manner, the cards transferred to the output station 295 are arranged in the station in an ascending progression of binary data at the control area for each pair of the first subgroups merged from the input stations 283 and 289. This operation proceeds for successive ones of the first subgroups until, at the end of the first pass, the subgroups of cards appear in the output station 295 as described above. The passes of subgroups of cards from the input stations 283 and 289 to the output station 295 are then repeated until the desired number of first subgroups of cards has been arranged in sequence into second subgroups in the output station 295 in accordance with the value of the control data on each card. For example, eight of the first subgroups may be merged to form one of a plurality of second subgroups by merging the cards from the station 283 and 289 to the output station 295 in three successive passes. In this way, each of the second subgroups may contain eighty cards with twenty items on each card.

In FIGURE 7, the card 300 represents an information storage card from the input station 283, the card being carried by the vacuum pressure transporting drum 276 to be processed by the transducer means 286. The transducing means 286 is represented in FIGURE 7 by a series of electro-magnetic transducer heads 286a, 286b, 286c and 286d.

As noted above, the data may be recorded on the card 300 in a series of rows which extend lengthwise across the card. These rows are shown in FIGURE 7 as extending in the horizontal direction. Each of these rows is scanned by a different one of the heads 286a, 286b, 286c and 286d. The heads 286a, 286b and 286c respectively scan three rows of data. It should be evident that more or less rows can be used and that a corresponding number of heads can be provided depending upon the rows so used. The data in the various rows may be represented by magnetic dots of one polarity or the other, as noted previously.

The bits of binary information in the various rows are disposed so that they extend in transverse columns across the card, corresponding to the vertical direction in FIGURE 7. Each transverse column, or group of columns, may represent a different binary number to correspond to a position on the card. Each position on the card is represented by a clock recording, and these clock recordings extend along the lower row of the card to be scanned by the transducer head 286d. The latter recordings, for example, are of a single polarity, and the head 286d produces an electric pulse for each position of the card scanned.

A particular number of positions on the card 300 and a corresponding number of transverse columns may be considered as a control area to represent a particular item recorded on the card. In the particular example of the invention described above, each card is assumed to contain twenty control areas and a corresponding twenty items.

The card 302 in FIGURE 7 is intended to represent one of the cards from the input means 289, the card being carried by the transporting drum 278 to be processed by the transducer means 290. The transducer means 290 is represented in FIGURE 7 by a series of transducer heads 290a, 290b, 290c and 290d. The heads 290a, 290b and 290c scan different rows of binary data on the card 302, and the head 290d scans the clock row on that card in a manner similar to that described above for the card 300. The composition of the data on the card 302 is, naturally, the same as the composition of the data on the card 300.

The transducer heads 286a, 286b, 286c and 286d are respectively connected to a series of amplifiers 304, 306, 308 and 310. The transducer heads 290a, 290b, 290c and 290d are respectively connected to a series of amplifiers 312, 314, 316 and 318. The amplifiers 304, 306 and 308 are respectively connected to the left input terminals of each of a series of flip-flops 320, 322 and 324, and to each of a series of associated inverters 326, 328 and 330. The output terminals of these inverters are respectively connected to the right input terminals of the flip-flops 320, 322 and 324.

As noted above, flip-flops are known to the electronic digital computer art. These units may be constructed in a manner similar to that described on pages 164–166, inclusive, of volume 19, entitled "Wave Forms" of the Radiation Laboratories Series, published in 1949 by the Massachusetts Institute of Technology. These flip-flops are bi-stable relaxation circuits. Each of the flip-flops is provided with two input terminals designated for convenience as the left and right input terminals, and each is provided with two output terminals designated for convenience as the left and right output terminals. The input terminals are shown at the bottom of the block representing the flip-flop and the output terminals are shown at the top of the block. A negative input signal introduced to either of the input terminals produces a relatively high voltage at the corresponding output terminal of the flip-flop which persists after the negative signal is removed. The flip-flop is said to be in a true state when a relatively high voltage appears at its left output terminal, and it is said to be in a false state when a relatively high voltage appears at its right output terminal.

The left and right output terminals of the flip-flop 320 are connected respectively to an "and" network 332 and to an "and" network 334. The left and right output terminal of the flip-flop 322 are connected respectively to an "and" network 336 and to an "and" network 338. Likewise, the left and right output terminals of the flip-flop 324 are connected respectively to an "and" network 340 and to an "and" network 342.

The "and" networks may be constructed in a manner similar to that described on page 32 of "Arithmetic Operations in Digital Computers," by R. K. Richards (published by D. Van Nostrand Company, Inc., of Princeton, New Jersey, in 1955). As mentioned previously, each of the "and" networks is provided with a plurality of input terminals, and each is constructed in known manner so that a signal passes through the network only when positive signals are simultaneously impressed on all of its input terminals.

The "and" networks 332 and 334 are connected respectively to the left and right input terminals of a flip-flop 344. The "and" networks 336 and 338 are connected respectively to the left and right input terminals of a flip-flop 346. Also, the "and" networks 340 and 342 are connected respectively to the left and right input terminals of a flip-flop 348.

The amplifier 310 is connected to the left input terminal of a flip-flop 350 and to the input terminal of a delay line 352. The output terminal of the delay line is connected to the right input terminal of the flip-flop 352. The left output terminal of the flip-flop 350 is connected to a binary counter 354. The binary counter is connected to an adjustable selector 356 which, in turn, is connected to a compare network 358. This selector may be controlled automatically so that the sorting of the cards may proceed from column to column throughout each control field corresponding to the particular item in question.

The arrangement of the binary counter 354, the selector 356 and the compare network 358 is fully described in copending application Serial No. 566,404 filed February 20, 1956, by Jerome B. Wiener. Briefly, the delay line 352 imparts a delay to each pulse from the amplifier 310 so that the pulse first triggers the flip-flop 350 from a false state to a true state, and then the delayed pulse returns the flip-flop to its original false state before the next pulse from the amplifier 310 triggers the flip-flop to its true state. Therefore, a series of pulses appears at the left output terminal of the flip-flop 350 corresponding to the clock recordings scanned by the head 286d which, in turn, correspond to successive positions on the card 300.

The pulses from the flip-flop 350 are applied to the binary counter 354. The binary counter comprises a series of flip-flops connected in known manner to be successively triggered from one state to another in response to the pulses from the flip-flop 350.

The selector 356 may comprise a series of switches which are connected to the various flip-flops in the binary counter 354. These switches selectively connect one or the other of the output terminals of these flip-flops to the compare network 358. These switches may be adjustable so that the flip-flops in the binary counter are required to assume a selected pattern before the compare network 358 will produce an output signal. This pattern corresponds to a selected count of the binary counter 354 which, in turn, corresponds to a selected position on the card 300.

Therefore, by the adjustment of the selector 356, the compare network 358 may be made to produce an output pulse for a particular selected position on the card 300 and only for that position. The selector may be controlled in known manner so that only the position, or positions, on the card corresponding to the desired item on that card are processed by the equipment.

The resulting pulse from the compare network 358 corresponding to the position on the card 300 to be processed is introduced to each of the "and" networks 332, 334, 336, 338, 340 and 342. These "and" networks, therefore, become conditioned for conduction only for the selected position on the card 300.

The amplifiers 312, 314 and 316 are connected respectively to the left input terminals of a series of flip-flops 360, 362 and 364, and to the input terminals of a corresponding series of inverters 366, 368 and 370. The output terminals of the inverters are connected respectively to the right input terminals of the flip-flops 360, 362 and 364. The inverters 366, 368 and 370, as well as the inverters 326, 328 and 330, are usual phase inverters and serve to reverse the polarity of pulses introduced to them. These inverters, for example, may be vacuum tube circuits.

The left and right output terminals of the flip-flop 360 are connected respectively to an "and" network 372 and to an "and" network 374. The left and right output terminals of the flip-flop 362 are connected respectively to an "and" network 376 and to an "and" network 378. Finally, the left and right output terminals of the flip-flops 364 are connected respectively to an "and" network 380 and to an "and" network 382.

The "and" networks 372 and 374 are connected respectively to the left and right output terminals of a flip-flop 384. The "and" networks 376 and 378 are connected respectively to the left and right input terminals of a flip-flop 386. Finally, the "and" networks 380 and 382 are connected respectively to the left and right input terminals of a flip-flop 388.

The amplifier 318 is connected to the left input terminal of a flip-flop 390 and to the input terminal of a delay line 392. The output terminal of the delay line is connected to the right input terminal of the flip-flop 390. The left output terminal of the flip-flop 390 is connected to a binary counter 394. The binary counter 394, in turn, is connected to a selector 396, the selector being connected to a compare network 398. The compare network 398 is connected to an input terminal of each of the "and" networks 372, 374, 376, 378, 380 and 382.

The arrangement of the binary counter 394, the selector 396 and the compare network 398 may be similar to the arrangement described above of the binary counter 354, the selector 356 and the compare network 358. The output terminals of the flip-flops 384, 344, 346, 348, 386 and 388 are all connected to respective input terminals of a comparator 400. The comparator is shown in block form for purposes of simplicity. The comparator is formed from a plurality of "and" and "or" networks interrelated in a logical pattern. The comparator may be constructed and operated in a manner similar to that disclosed in copending application Serial No. 566,404 filed February 20, 1956 by Jerome B. Wiener and in Edwards Patent 2,615,127 and in Woolard Patent 2,641,696.

In a manner to be described, the flip-flops 344, 346 and 348 may be triggered into a pattern of operational states which represent a multi-digit binary number. In like manner, the flip-flops 384, 386 and 388 may be triggered to a pattern of operational states which also represent a multi-digit binary number. The comparator 400 functions to compare the binary number in one of the sets of flip-flops with the binary number stored in the other set. Should one of these binary numbers exceed the other, the comparator 400 develops a pulse on its output lead 402. Should the numbers be equal, the comparator develops a pulse on its output lead 404. Finally, should the second binary number exceed the first, the comparator develops a pulse on its output lead 406. The comparator accomplishes this result in a manner understood in the art, and as described in the application referred to above. The comparator 400 may be constructed in a manner similar to that described in Edwards Patent 2,615,127 and Woolard Patent 2,641,696.

The leads 404 and 406 from the comparator 400 are connected to an "or" network 408. This "or" network may be any of the well known types of such networks which are now in general use in the computer art. As mentioned previously, these "or" networks are conditioned to pass a signal upon the introduction of a positive signal to any one or more of its input terminals. The "or" network may be constructed, for example, in a manner similar to that described on page 32 of "Arithmetic Operations in Digital Computers," by R. K. Richards (published by D. Van Nostrand Company, Inc., of Princeton, New Jersey, in 1955).

The output signals from the "or" network 408 are introduced to the left input terminal of a flip-flop 410 and to the input terminal of a delay line 412. The output terminal of the delay line 412 is connected to the right input terminal of the flip-flop. The left output terminal or the flip-flop 410 is connected to the control grid of a triode 414. A resistor 416 is connected to the control grid and to the negative terminal of a source of direct voltage 418. The cathode of the triode is grounded, and its anode is connected to one terminal of the energizing winding of the solenoid valve 288 associated with the hold station 287. The other terminal of the latter solenoid winding is connected to the positive terminal of the source of direct voltage 418, this source having a common terminal connected to ground.

The signals on the output lead 402 of the comparator 400 are also introduced through an "or" network 417 to the left input terminal of a flip-flop 419 and are further introduced to the input terminal of a delay line 420. The output terminal of the delay line is connected to the right input terminal of the flip-flop 419. The left output terminal of the flip-flop 419 is connected to the control grid of a triode 422. A resistor 424 is interposed between that control grid and the negative terminal of the source 418. The cathode of the triode 422 is grounded, and its anode is connected to the energizing winding of the solenoid valve 293 associated with the hold station 291.

The positive terminal of the source 418 is connected to the armature of a push-button type of manually operated start switch 426. The fixed contact of the switch 426 is connected to a capacitor 428, and the capacitor is connected to the input terminal of a differentiator 430. This differentiator may be similar to the differentiator 242 described in conjunction with FIGURE 5, such differentiators being described on pages 2–27 to 2–38, inclusive, of "Principles of Radar" (Second Edition) published by the Massachusetts Institute of Technology.

The output signals from the differentiator 430 and from the "or" network 408 are introduced through an "or" network 431 to the left input terminal of a flip-flop 432 and are also introduced to the input terminal of a delay line 434. The output terminal of the delay line 434 is connected to the right input terminal of the flip-flop 432. The left output terminal of the flip-flop 432 is connected to the control grid of a triode 436. The cathode of the triode 436 is grounded. A resistor 440 is connected between the negative terminal of the source 418 and the control grid of the triode 436. The anode of the triode 436 is connected to the energizing winding of the solenoid valve 285. The energizing winding of the solenoid valve 285 has potentials applied to it from the voltage source 418.

The signals from the differentiator 430 and from the "or" network 417 are also introduced through an "or" network 433 to the left input terminal of a flip-flop 435 and to the input terminal of a delay line 437. The signals from the delay line 437 pass to the right input terminal of the flip-flop 435. The output signals on the left output terminal of the flip-flop 435 are introduced to the grid of a triode 438, the grid being negatively biased through a resistance 442 from the voltage source 418. The plate of the triode 438 is connected to one terminal of the solenoid valve 294. The second terminal of the solenoid valve 294 is connected to receive a positive potential from the voltage source 418.

The signals from the lines 402, 404 and 406 are introduced through an "or" network 470 to input terminals of binary counters 472, 473 and 475. The counter 472 may be constructed to produce an output signal upon each occurrence of a count related to the number of cards in each of the first subgroups. As described previously, each of the first subgroups may contain ten cards. Since pairs of subgroups are being merged, an output signal may be produced by the binary counter 472 upon each count to a decimal value of "19," which is one less than the total number of cards in each pair of subgroups. In like manner, the counter 473 may be constructed to produce an output signal upon each concurrence of a decimal count of "39" and the counter 475 may be constructed to produce an output signal upon each occurrence of a decimal count of "79."

An "and" network 474 has input terminals connected to the output terminal of the counter 472 and to the right output terminals of flip-flops 480, 482 and 484. Connections are made to input terminals of an "and" network 476 from the counter 473, the left output terminal of the flip-flop 480 and the right output terminals of the flip-flops 482 and 484. An "and" network 478 is operatively controlled by the signals from the counter 475, the left output terminals of the flip-flops 480 and 482 and the right output terminal of the flip-flop 484.

The signals from the "and" networks 474, 476 and 478 pass through an "or" network 486 to input terminals of the "or" networks 408 and 417. Signals from an "and" networks 490, 492 and 494. Second inputs terminals of the "or" networks 408 and 417. The "and" network 488 has input terminals connected to the left output terminals of the flip-flops 480, 482 and 484.

The signals from the "and" networks 474, 476 and 478 are respectively introduced to input terminals of "and" networks 490, 492 and 494. Second inputs terminals of the "and" networks 490, 492 and 494 are connected to a switch in the output station 295, this switch being shown in FIGURE 9. The switch is disposed to become closed when the last card in the station 295 has left the station. The output signals from the "and" networks 490, 492 and 494 are respectively introduced to the left input terminals of the flip-flops 480, 482 and 484.

The "and" networks 474, 476, 478 and 488, the "and" networks 490, 492 and 494 and the flip-flops 480, 482 and 484 are included only by way of example. Actually, further stages of "and" networks and flip-flops may be required, as will become apparent subsequently. However, it is believed that a person skilled in the art will understand how to extend the chain of "and" networks and flip-flops from the discussion above and the subsequent discussion. As described above, the purpose of the apparatus of FIGURE 6 is to sort the information storage cards from the apparatus of FIGURE 4 on the basis of the first item on each card. As previously described, an item on a card may constitute a plurality of binary bits in a column or in a group of columns. To carry out this purpose, the cards deposited in the output station 222 of FIGURE 4 are divided into two stacks, as mentioned above, with one stack being placed in the input station 283 of FIGURE 6 and with the other station being placed in the input station 289. The cards from these two input stations are then processed by the apparatus of FIGURE 6 on the basis of the first item on each card.

For a first pass through the apparatus, the first one of the first subgroups of ten cards in the input station 283 is merged with the first one of the first subgroups of ten cards in the input station 289 on the basis of the control item such as the first item on each card. Then, the next one of the first subgroups of ten cards in the input station 283 is merged with the next one of the first subgroups of ten cards in the input station 289 on the basis of the control item such as the first item on each card. This merging continues for successive one of the first subgroups of ten cards in the input station 283 and for successive one of the first subgroups of ten cards in the input station 289. At the end of the first pass, the output station 295 contains first sequences of cards. Each of the first sequences contains twenty cards arranged in order with respect to the first item on the cards in the sequence.

The cards are again divided into the input stations 283 and 289 so that half of the first sequences of twenty cards are disposed in the station 283 and the other half of the first sequences of twenty cards are disposed in the station 289. After the cards have been returned to the input stations 283 and 289, the cards are again passed through the apparatus of FIGURE 6. These passes are continued until the output station 295 contains second sequences, as described above, with each sequence containing a particular number of cards greater than the number of cards in the first sequence. By way of illustration, the number of cards in each of the second sequences may be forty cards.

When all of the cards have been transferred to the output stack 295, the forty cards in each of the second sequences are returned from the output stack 295 to the input stacks 283 and 289. The cards in one-half of the second sequences are returned to the input stack 283 and the cards in the other sequences are returned to the input stack 289. The cards are then merged and sorted in a manner similar to that described above to produce second subgroups each containing eighty cards. The merging and sorting occurs on the basis of the value of a particular item such as the first item on each card. Each of the second subgroups containing eighty cards is then processed by the computer 216 in FIGURE 4 so that the items of information on the different cards in the subgroups becomes internally rearranged in accordance with the values of the different items.

To carry out the operation described above of merging and sorting the cards to produce second subgroups of eighty cards from first subgroups of ten cards, the first stack of cards is placed in the input station 283 and the second stack is placed in the input station 289. This may be accomplished manually or may be accomplished automatically as will be seen from the discussion of the apparatus shown in FIGURES 9 and 11. The selectors 356 and 396 are adjusted so that the compare networks 358 and 398 condition the "and" networks 332, 334, 336, 338, 340 and 342 and the "and" networks 372, 374, 376, 378, 380 and 382 for conduction only at a particular position or positions on each card from the input station. This position corresponds to the control area being processed on each card. In the particular example, this item is assumed to be the first item, which is the one represented by the lowest binary number on each card.

The start switch 426 is then depressed. This causes a charge of current to flow into the capacitor 428 so that a pulse is introduced to the differentiator 430. The differentiator produces in response to that pulse an output pulse having a sharp negative-going edge, and this output pulse triggers the flip-flops 432 and 435 to the true state. The triggering of the flip-flops 432 and 435 to the true states produces a relatively high voltage of positive polarity at the left output terminals of the flip-flops. This voltage overcomes the negative bias on the control grids of the triodes 436 and 438 to render both of these triodes conductive.

The conducivity of the triodes 436 and 438 results in a current flow through the energizing windings of the solenoid valves 285 and 294 to close both of these valves. A first card is released, therefore, from the input station 283 and from the input station 289. The release of these cards results from the fact that the energizing of the solenoid-actuated valves 285 and 294 causes them momentarily to close and interrupt the vacuum pressure to the feed heads 284 and 292.

The delay line 434 causes the pulse from the differentiator 430 to return the flip-flop 432 to a false state. The timing is such that this occurs after the first card has been released from both the stations but in time to prevent any further cards from being released from the stations.

The solenoid valves 288 and 293 are not activated during this starting operation. Therefore, the first card from the input station 283 is carried by the transport drum 276 past the transducer means 286 to the hold station 287. Because the solenoid valve 288 is not activated, it is open and a vacuum pressure is established at the hold station 287 to hold that card. Likewise, the first card released from the input station 289 is carried by the drum 278 past the transducer 290 to the hold station 291. This hold station serves to arrest that card, because no energizing current is passing through the solenoid valve 293 and that valve is open.

As the first card from the input station 283 is processed by the transducer heads 286a, 286b and 286c of FIGURE 7, the resulting pulses from the amplifiers 304, 306 and 308 trigger the flip-flops 320, 322 and 324 into a pattern of operational states at each position, or positions, on the card which corresponds to the binary number recorded at that position. However, the "and" networks 332, 334, 336, 338, 340 and 342 are conditioned for translation only at the selected position, or positions, on the card, so that the flip-flops 344, 346 and 348 are triggered into a pattern of operational states corresponding to the binary number recorded at the selected position.

In exactly the same manner, the flip-flops 384, 386 and 388 are triggered into a pattern of operational states which represents the binary data recorded at the particular selected position of the card from the input station 289.

Should the number represented by the binary data recorded at the selected position of the first card from the input station 283 be less than the number represented by the binary data recorded at the selected position of the card from the input station 289, the comparator 400 will develop a pulse on its lead 406. This pulse will trigger the flip-flop 410 to a true state, so that a relatively high voltage appears at its left output terminal. This voltage overcomes the negative bias on the control grid of the triode 414 and the triode is rendered conductive.

The conductivity of the triode 414 causes the solenoid valve 288 to be energized so that the card held by the hold station 287 is released. At the same time, the signal on the output line 406 of the comparator 400 passes through the "or" networks 408 and 431 and triggers the flip-flop 432 to the true state so that a new card is released from the input station 283. The flip-flop 432 is conditioned to its true state only long enough to permit a single card to be released from the input station, and then the delayed pulse from the delay line 434 returns the flip-flop 432 to a false state. During this interval, the triodes 422 and 438 remain non-conductive so that the card held by the hold station 291 continues to be held and cards in the input station 289 remain in that station.

In the manner described above, cards may be successively and continuously released from the hold station 287 and from the input station 283 until the value of the multi-digit binary item at the selected position of a particular card processed by the transducer heads 286a, 286b and 286c is greater than the value of the item at the selected position on the card held in the hold station 291. When this occurs, no pulse apperas on the leads 404 or 406 from the comparator 400 and the processed card is therefore held in the hold station 287 and no further card is released from the input station 283. However, a pulse appears on the output lead 402 from the comparator 400 to trigger the flip-flop 419 to a true state. This triggering of the flip-flop 419 causes the triode 422 to become conductive which, in turn, causes the held card to be released from the hold station 291. At the same time, the signals on the output lead 402 of the comparator 400 passes through the "or" networks 417 and 433 and triggers the flip-flop 435 to the true state. This causes the triode 438 to become conductive and the solenoid valve 294 to become energized so that a new card is released from the input station 289.

Now, cards are successively released from the hold station 291 and from the input station 289 each time a pulse appears on the lead 402, and this occurs until the value of the item at the selected position of a subsequent card being processed is equal to or greater than the number at the selected position on the card held by the hold station 287. The latter situation causes pulses again to appear on the leads 404 or 406 from the comparator so that cards are again successively released from the hold station 287 and from the input station 283.

Therefore, in the described manner, the cards in the input station 283 and in the input station 289 are alternately released or held in a particular order until all of the cards in a pair of first subgroups become merged into the output station 295. This enables an ascending progression of cards in each of the input stations to be merged into a single stack in a sorted ascending order in the output station 295 with respect to the first item on each card.

Each signal produced by the comparator 400 passes through the "or" network 470 because of the connection of all of the output lines of the comparator to the "or" network. Since the comparator 400 produces a signal only when a card is about to be introduced to the output station 295, the signals passing through the "or" network 470 indicate the number of cards being introduced to the output station. The number of cards passing to the output station 295 is counted by the counters 472, 473 and 475. When the number of cards passing to the output station 295 initially corresponds to nineteen cards, an output signal is produced by the binary counter 472 and is introduced to the "and" network 474. In this way, the counter 472 provides an output signal when all of the cards in one of the first subgroups from the input station 283 and all of the cards from one of the first subgroups in the input station 289 have been transferred from the stations to the drums 276 and 278 in FIGURE 6.

The flip-flops 480, 482 and 484 are initially in their false state of operation. This causes the "and" network 474 to be conditioned for the passage of output signals from the binary counter 472. These signals pass through the "or" network 486 and the "or" network 408 to the flip-flop 410 so as to trigger the flip-flop to the true state of operation. When the flip-flop 410 becomes triggered to the true state of operation, the hold station 287 becomes deactivated so that any card retained by the hold station is able to become transferred to the output station 295. At the same time, the signal from the "and" network 474 passes through the "or" network 486 and the "or" network 417 to the flip-flop 419 and triggers the flip-flop to the true state. This causes the hold station 291 to become momentarily deactivated so that any card retained by the hold station can become transferred to the output station 295. In this way, the last card in each of the first subgroups being merged from the input stations 283 and 289 into the output station 295 becomes transferred from one of the hold stations to the output station.

The signal from the "and" network 474 also passes through the "or" network 486, the "or" network 408 and the "or" network 431 to the flip-flop 432 so as to trigger the flip-flop to the true state. The signal also passes through the "or" networks 417 and 433 and triggers the flip-flop 435 to the true state. This causes the first cards in the next ones of the first subgroups in the stations 283 and 289 to be respectively transferred to the drums 276 and 278. This initiates a merging operation of the cards in these subgroups in a manner similar to that described previously. When nineteen cards have again been transferred from the input stations 283 and 289 to the output station 295, an output signal is again produced by the counter 472. This output signal again passes through the "and" network 474 so as to cause the last card to be released by one of the hold stations 287 and 291 for transfer to the output station 295.

After all of the cards in the input stations 283 and 289 have become transferred to the output station 295 and the cards in the output station 295 have been returned to the input stations, a signal passes through the "and" network 490 and triggers the flip-flop 480 to the true state. This causes the "and" network 474 to become deactivated and the "and" network 476 to become prepared for activation. The "and" network 476 in turn passes a signal every time that an output signal is produced by the counter 473. However, the counter 473 is constructed to produce an output signal every time that thirty-nine cards have passed from the input stations 283 and 289 to the output station 295. This corresponds to the operation of the system shown in FIGURE 7 in producing a merger of an intermediate sequence of twenty cards from one of the input stations with an intermediate sequence of twenty cards from the other intermediate station.

Upon each production of an output signal by the counter 473, a signal passes through the "and" network 476 and the "or" network 486 to the flip-flops 410 and 419 to obtain a release of any cards being retained by the hold stations 287 and 291. At the same time, a signal passes through the "or" networks 431 and 433 to trigger the flip-flops 432 and 435 to the true states. This causes the first cards in the next sequence of twenty cards in each of the input stations 283 and 289 to be released to the drums 276 and 278 for the initiation of a new merging operation.

When all of the cards in the input stations 283 and 289 have been merged into the output station 295 to form sequences of forty cards in each sequence, the cards become returned to the input stations 283 and 289 as described previously. Upon the return of all of the cards from the station 295 to the input stations 283 and 289, a signal passes through the "and" network 492 and triggers the flip-flop 482 to the true state. The resultant production of a relatively low signal on the right output terminal of the flip-flop 482 causes the "and" network 476 to become deactivated and the "and" network 478 to become activated. Since the "and" network 478 is now activated, a signal is able to pass through the "and" network 478 every time that an output signal is produced by the counter 475.

The counter 475 is constructed to produce an output signal every time that seventy-nine cards have passed to the output station 289. This corresponds to a merger of two sequences of forty cards in each sequence, with a last card in the two sequences being retained by one of the hold stations 287 and 291. This last card is released for movement to the output station 295 by the passage of a signal through the "and" network 478 and the "or" network 486 to the left input terminals of the flip-flops 410 and 419.

At the same time, a signal passes to the left input terminals of the flip-flops 432 and 435 so that the first card in the next sequence of forty cards in the input station 283 and the first card in the next sequence of forty cards in the input station 289 become transferred to the drums 276 and 278. This initiates a new merging operation in which the forty cards in the next sequence in the input station 283 become merged with the forty cards in the next sequence in the input station 289.

It will be seen from the previous discussion that the circuitry shown in FIGURE 7 can be extended to control the merging of any number of cards in an intermediate sequence or in one of the subgroups. For example, the circuitry can be extended to control the merging of eighty cards in each of the second subgroups in the stations 283 and 289. The circuitry shown in FIGURE 7 can also be extended to obtain the merging of subgroups which contain a greater number of cards than eighty cards.

As described above, the cards are merged in the apparatus of FIGURE 6 through a sufficient number of passes to provide the desired number of cards in each of the second subgroups. As previously described, eighty cards may be included in each of the second subgroups. When the desired number of cards are obtained in each of the second subgroups, the cards from the output station 295 of the apparatus of FIGURE 6 are again placed in the input station 204 of the apparatus of FIGURE 4. The contents of a first particular number of cards from the first one of the second subgroups are transferred into the computer 216 for sorting. The information in only a particular number of cards is fed into the computer for sorting because of the limited capacity of the computer. In the particular example of the invention now under consideration, the contents of the first eight cards in the first one of the second subgroups may be transferred into the computer for sorting. This, in the particular example, represents 160 items which is below the assumed capacity of the computer, this capacity having been previously stated to be 200 items.

Therefore, the first group of card sequences from the output station 295 of FIGURE 6 are now placed in the input station 204 of FIGURE 4. The control system of FIGURE 8 is now used in conjunction with the apparatus of FIGURE 4. This control system serves to feed eight cards in succession from the input station 204 so that their contents may be read by the transducer 214 into the input unit 218 of the computer 216.

After the contents of eight cards have been so read into the input unit 218, with these cards being deposited in the output station 208, the computer begins its merging-sorting operation, until the contents of one of the eight cards have been exhausted. Then, the computer develops an output signal indicating that it is ready for a new card, and the control system of FIGURE 8 serves to cause the contents of the next card in the second subgroup being processed at that instant to be read into the computer. Whenever the computer has twenty items arranged in order and constituting the lowest values in the computer, it develops an output signal. The control system of FIGURE 8 responds to this output signal to feed a card from the input station 226 to the transport medium 218 so that such card may have data written on it by the transducer means 232.

When one subgroup of card sequences has been processed and has its data recorded by the transducer 232 on a plurality of cards in a progressive order on each card and on the successive cards in the subgroup, the information in the first eight cards in the next one of the subgroups in the input station 204 is introduced into the computer 216. The sorting operation is then repeated for these cards in a manner similar to that discussed previously. Thus, as the information in each of the eight cards in the subgroups becomes transferred to an output card, the information from a next card in the subgroup becomes transferred into the computer for processing. In this way, the information in each subgroup becomes sorted and becomes transferred to output cards.

After the information on the cards in each subgroup has become sorted in this manner, the information in the next subgroup becomes sorted in a similar manner and becomes transferred to output cards. This is continued until the items from all of the subgroups of cards have been processed by the computer so that a plurality of cards appears in the output station 222, each of the cards bearing twenty items in order.

The control system of FIGURE 8 includes a pushbutton start switch 536 which may be similar to the start switch 236 of FIGURE 5. The start switch 536 may be manually operated or it may be coupled electrically to a switch in the output station 295 of FIGURE 6 so as to become closed when the last card in the station 295 has passed to the station 204. The start switch has a normally open contact connected to the positive terminal of the source of direct voltage 234, and its armature connects with a capacitor 540. The normally closed fixed contact of the push-button start switch 536 is connected to a discharge resistor 538 for the capacitor 540, the resistor and capacitor being connected to a differentiator 542. The differentiator 542 may be similar in construction to the differentiator 242 of FIGURE 5. The output signals from the differentiator 542 are introduced through an "or" network 545 to the left input terminal of a flip-flop 546.

The left output terminal of the flip-flop 546 is connected to an "and" network 548 and the output terminal of the "and" network is connected to a binary counter 552. The output terminal of the binary counter is connected to the right input terminal of the flip-flop 546. The control system of FIGURE 8 includes a source of clock pulses 550 and this source is similar to the source 250 of FIGURE 5. An output terminal of the source 550 is connected to the "and" network 548, and another output terminal is connected to the computer 216 to time the computer operations.

The computer has an output lead 554 upon which it develops a pulse when the contents of a particular card have been exhausted to indicate that the computer is ready for the contents of a new card. The lead 554, together with the output terminal of the "and" network 548, are connected to respective input terminals of an "or" network 556. The "or" network is connected to the control grid of the triode 264, this triode controlling the solenoid valve 272 associated with the feed head 206 of the input station 204 in the manner described in conjunction with FIGURE 5.

The computer 216 develops a pulse on a lead 558 when successive groups of twenty items have been sorted and the computer is ready to have a group written on an information card. The lead 558 is connected to the control grid of the triode 266. This latter triode controls the energizing of the solenoid valve 274 associated with the feed head 224 of the input station 222 of the apparatus of FIGURE 4.

The signals from the output line 558 of the computer 216 are introduced to counters 560, 562 and 564. Each of the counters 560, 562 and 564 is constructed to provide an output signal upon each occurrence of a particular decimal count in the counter. For example, the counter 560 may be constructed to produce an output signal upon each occurrence of a particular decimal count such as "72." This count represents the number of cards in each of the second subgroups after the information on the first eight cards in the subgroup have been introduced from the cards to the computer.

The signals from the counters 560, 562 and 564 are respectively introduced to "and" networks 566, 568 and 570. Other input terminals of the "and" network 566 are connected to the right output terminals of flip-flops 572, 574 and 576. Connections are also made to the input terminals of the "and" network 568 from the left output terminal of flip-flop 572 and the right output terminals of the flip-flops 574 and 576. The "and" network 570 also receives signals at its input terminals from the left output terminals of the flip-flops 572 and 574 and the right output terminal of the flip-flop 576.

The signals from the "and" networks 566, 568 and 570 are respectively delayed by stages 577, 579 and 581 and then are introduced through an "or" network 578 to an input terminal of the computer 216. The signals from the "and" networks 566, 568 and 570 also pass through the "or" network 578, a delay line 593 and the "or" network 545 to the left input terminal of the flip-flop 546. The output signals from the "and" networks 566, 568 and 570 are also respectively introduced to input terminals of "and" networks 580, 582 and 584. Second input terminals of the "and" networks 580, 582 and 584 are connected to a switch which is included in the station 204 so as to become closed when the last card leaves the station. The signals from the "and" networks 580, 582 and 584 in turn respectively trigger the flip-flops 572, 574 and 576 to the true states.

As mentioned above, the cards in all of the first subgroups are transferred from the output station 295 of FIGURE 6 to the input station 204 of FIGURE 4. The start switch 536 is then momentarily depressed to cause the differentiator 542 to trigger the flip-flop 546 to a true state. The triggering of the flip-flop 546 to a true state conditions the "and" network 548 for conduction. This enables the "and" network 548 to pass clock pulses to the triode 264 and to the binary counter 552. For each clock pulse, the triode 264 causes a card to be released from the input station 204. After eight cards have been so released, the binary counter 552 develops an output pulse, and this returns the flip-flop 546 to a false state. Therefore, no more cards are released at present from the input station 204.

The contents of the released cards are read by the transducer 214 and are introduced to the computer 216. The computer sorts these items so that they appear in a single sequence at the end of the sorting operation. As the first twenty items (in the particular example) become available, the computer develops an output signal on the lead 558. This output signal causes a card to be released from the station 222 so that the sorted items may be written on the card by the write head 232. The card is then deposited in the output station 226. In this manner, each time the computer has twenty sorted items available, a card is released from the station 226 to receive these items.

In like manner, whenever the computer has completely sorted the contents of any particular card read into it, it develops a signal on the lead 554. This signal pulses the triode 264 so that a new card becomes released from the station 204 and so that its contents are read into the computer. In this manner, the capacity of the computer is not exceeded, and the computer continues its sorting operation until the contents of all the cards in each of the first subgroups of the input station 204 have been sorted into a proper order and have been recorded on cards transferred by the drum 218 from the input station 222 to the output station 226. This operation is continued for successive ones of the first subgroups until the items of information on the cards in all of the first subgroups have been similarly rearranged.

As previously described, a signal passes through the "or" network 556 every time that information is recorded from the computer 216 on one of the cards from the station 222 in FIGURE 4. The signals from the "or" network 556 are introduced to the counters 560, 562 and 564, which operate to count the number of signals introduced to the counters. During the time that the first subgroups of cards are being introduced from the station 204 for recording of the information on the cards in the computer and for the rearrangement of this information by the computer, the "and" network 566 is prepared for activation. This results from the fact that relatively high voltages are simultaneously introduced to the "and" network 566 from the right output terminals of the flip-flops 572, 574 and 576. Because of the preparation of the "and" network 566 for activation, the output signals from the counter 560 pass through the "and" network 566 and the "or" network 578 to the computer 216.

The counter 560 is constructed to provide an output indication upon each occurrence of a decimal count of "2." When the counter 560 provides an output indication, it introduces a signal through the "and" network 566, the delay line 577 and the "or" network 580 to the computer 216 to indicate to the computer that the information rearranged by the computer and still remaining in the computer should be introduced to the next eight cards from the station 222. Information for eight cards still remains in the computer since information has only been recorded on two cards out of the ten possible cards in the first subgroup being processed at that instant. After a slight delay provided by the stage 593, the signal passes from the "and" network 566 through the "or" networks 578 and 545 to the flip-flop 546 and triggers the flip-flop to the true state. This causes the first eight cards in the next subgroup to be introduced to the computer for rearrangement of this information.

In this way, the information in successive ones of the first subgroups becomes rearranged by the computer. When all of the first subgroups of cards have had their information rearranged by the computer 216, a signal passes through the "and" network 580 because of the passage of all of the cards from the station 204. This signal triggers the flip-flop 572 to the true state, thereby de-activating the "and" network 566 and preparing the "and" network 568 for activation. Since the "and" network 568 is now prepared for activation, the output signals from the counter 562 pass through the "and" network and the "or" network 578 to the computer 216 the next time that the computer operates to sort the items of information on the different cards from the station 204. As previously described, the computer 216 sorts the items of information on the cards in each of the second subgroups in the next pass of cards from the station 204.

The counter 562 is constructed to provide an output signal upon each decimal count of "72," which corresponds to the number of cards passing from the station 222 to receive information in each of the second subgroups. The counter 562 provides an output indication upon a count of "72" since the computer 216 still has the information for eight cards at this time. This causes the counter 562 to produce an output signal every time that the information in all of the cards in one of the second subgroups has been introduced to the computer 216 for rearrangement.

The rearrangement of information on the cards of each of the second subgroups is instituted by the computer 216. This results from the passage of a signal to the computer 216 from the "and" network 568 after each count of "72" by the counter 562. Upon the occurrence of such a count, the computer 216 produces a signal which causes the information in the last eight cards in each of the second subgroups to be recorded in rearranged order on cards from the station 222. At the same time, a delayed signal passes from the "and" network 568 through the "or" networks 578 and 545 to the flip-flop 546 to trigger the flip-flop to the true state. This causes the information in the first eight cards of the next one of the second subgroups to be introduced to the computer for rearrangement.

After all of the cards in each of the second subgroups have had their information rearranged as described above, a signal passes through the "and" network 582 because of the passage of the last card from the station 204. This signal triggers the flip-flop 574 to the true state, thereby causing the "and" network 568 to become de-activated and the "and" network 570 to become prepared for activation.

In this way, signals from the counter 564 are able to pass through the "and" network 570 after each count of a particular number of cards. This count corresponds to the number of cards in each of third subgroups. For example, 640 cards may be included in each of the third subgroups. Under such circumstances, the counter 564 produces an output signal upon each occurrence of a decimal count of "632."

The signals from the counter 564 pass through the "and" network 570 to the computer 216 so as to cause the information remaining in the computer for each of the third subgroups to be recorded on cards from the station 222. The signals passing through the "and" network 568 further cause the information in the first eight cards of the next one of the third subgroups to be introduced to the computer 216 for rearrangement after a delay provided by the stage 581.

The circuitry shown in FIGURE 8 and described above may be extended through any desired number of additional stages dependent upon the total number of cards being processed and upon the number of items in each card. It is believed that a person skilled in the art will understand how to extend the circuitry shown in FIGURE 8 through additional stages in accordance with the detailed description set forth above.

After the computer 216 has rearranged the information in the cards in each of the first subgroups, the cards in the first subgroups in the output station 226 are again introduced to the input stations 283 and 289 such that the cards in one-half of the first subgroups pass to the station 283 and the cards in the other of the first subgroups pass to the station 289. Merging operations of cards in each of the subgroups in the input station 283 with the cards in each of the subgroups in the input station 289 are again effectuated through these successive passes. This causes the cards appearing in the output station 295 to represent second subgroups with eighty cards in each subgroup (in the particular example) and with the cards in each of the second subgroups being sorted on the basis of the first or lowest item on each card.

The items of information on the first eight cards in the second subgroups are again introduced to the computer 216 shown in FIGURE 4 under the control of the logical control system of FIGURE 8 so that the items of information in the cards in each of the second sequences may be rearranged and recorded on cards from the station 222. This operation of sorting the information on the cards continues for successive ones of the second subgroups until the information on the cards in all of the second subgroups has been sorted in this manner.

After the computer 216 has sorted all of the items on the cards in each of the second subgroups, the cards become rearranged into third subgroups each containing 640 cards. This rearrangement of the cards into third subgroups occurs on the basis of the value of the first item on each card in the third subgroup. The rearrangement of the cards into the third subgroups is produced by three successive merge-sort passes of the cards from the stations 283 and 289 to the station 295. Upon the rearrangement of the cards into the third subgroups, the items of information on the cards in each subgroup become sorted by the computer 216 in a manner similar to that described above. In this way, alternate operations are performed of rearranging the cards on the basis of the first item on each card and then of rearranging the information on the different cards in each subgroup. The alternate operations are performed until the items of information on all of the cards have a particular order such as an ascending order.

It will be appreciated that the systems shown in FIGURES 5 and 8 and described above represent alternate ways of controlling the operation of the computer 216 to obtain the rearrangement of the items of information on the cards of each of the subgroups of 10 cards. The system shown in FIGURE 5 may be superficially considered to be more desirable since it simultaneously sorts the items of information on all 10 cards in each of the first subgroups, whereas the system shown in FIGURE 8 initially sorts only the items on the first 8 cards and then subsequently receives the information on the last 2 cards for sorting. However, the system shown in FIGURE 8 may actually be considered more desirable than the system shown in FIGURE 5 since it operates on the cards in each of the first subgroups in a manner consistent with its operation on the cards in each of the other subgroups such as the second and third subgroups.

The discussion above has proceeded on the basis that the items from successive subgroups of ten cards are sorted as a first step by the computer. Actually, the items on each individual card may be initially sorted by the computer so as to appear in proper sequence on the card. This may be accomplished by the apparatus shown in FIGURE 5, for example, provided that the counter 252 is set to produce an output signal upon each count of "1" rather than each count of "10." The cards may then be sorted by the apparatus shown in FIGURES 6 and 7 to produce the successive ones of the first subgroups. The sorting of the cards by the apparatus shown in FIGURES 6 and 7 occurs on the basis of particular information of each card such as the first item on the card, as has been described in detail subsequently.

The steps of providing an internal sort of the information on each card and of alternately providing a rearrangement of the cards in accordance with the particular information on each card may be seen from the simplified example shown in FIGURE 10. In that example, only eight cards are shown and each card is provided with only four items or bits of information. The original disposition of the items on each card is shown in Column A of FIGURE 10. As will be seen, the items have a random arrangement with respect to their values. As a first step, the items on each card may be rearranged on that card to have a proper sequence in accordance with their respective values. This may be seen from Column B of FIGURE 10. The cards are then sorted and merged into subgroups of two cards in each subgroup on the basis of the first item on each card. This is indicated in column C of FIGURE 10.

As a next step in the example shown in FIGURE 10, the items of information on first subgroups of two cards in each subgroup are introduced to the computer for processing. This information is sorted and is recorded on the cards in a manner similar to that shown in Column D of FIGURE 10. Each of the first subgroups of two cards in the example shown in FIGURE 10 corresponds to a first subgroup of ten cards in the example set forth above in describing the construction and operation of the apparatus shown in FIGURE 4.

It will be seen from the example shown in FIGURE 10 that alternate steps occur of internally rearranging the information on cards in subgroups and then of rearranging the cards in accordance with the value of the first item on the cards. After each such rearrangement of the cards, the number of cards in a subgroup is increased before the next operation by the computer of rearranging internally the information on the cards. For example, the cards are next rearranged into second subgroups of four cards in each subgroup, as illustrated in Column E of FIGURE 10. This rearrangement occurs on the basis of the value of the first items on the cards. The items of information on the different cards in each subgroup are then rearranged into the proper order, as illustrated in Column F of FIGURE 10.

In Column G of FIGURE 10, the cards again become rearranged in accordance with the value of the first item on each card. As will be seen, the items on the different cards have not as yet been completely arranged into the proper order. However, if the items on three successive cards are introduced into a computer so that the computer can re-arrange these items into the proper order, the desired sequence would be obtained in the next column (not shown) corresponding to a column H. For example, after the items "02," "04," "05" and "11" in the first card of column G of FIGURE 10, have been transferred by the computer to one or more new cards, the items "29," "34," "42" and "47" become transferred into the computer from the fourth card in column G of FIGURE 10. In this way, the items on each successive card becomes transferred into the computer after all of the items on a previous card in column G have been recorded on a new card.

FIGURE 11 illustrates how the various drums and associated stations and gates shown in FIGURE 4 and 6 may be arranged to provide automatic rearrangements of the cards and the information on the cards without any necessity of manual handling of the cards between successive operations. As shown in FIGURE 11, the drums 276, 278 and 279 have relative dispositions corresponding to those shown in FIGURE 6. In addition, the drum 218 shown in FIGURE 4 is illustrated in FIGURE 11 as being disposed in contiguous relationship to the drum 279 at a position before the station 295 in the direction of rotation of the drum 279. In this way, the cards in the station 226 are able to be transferred to the station 295.

As will be seen in FIGURE 11, the drums 218 and 279 are shown in FIGURE 11 as rotating in opposite directions at the position of contiguity rather than in the same direction as with other pairs of drums. Under such circumstances, transfer of cards from the drum 218 to the drum 279 may be accomplished by providing a bridge 601 between the drums. The bridge 601 is fully disclosed in co-pending application Serial No. 614,686 filed October 8, 1956, by Jerome B. Wiener. The transfer of cards from the drum 218 to the drum 279 may also be accomplished by disposing a drum (not shown) between the drums 218 and 279 so that a card becomes transferred from the drum 218 to the drum (not shown) and then to the drum 279.

A drum 600 is disposed in contiguous relationship to the drum 279 on the opposite side of the station 295 from the drum 218. The drum 600 is, in turn, disposed in contiguous relationship to the drum 200. By providing such an arrangement, the cards in the station 295 are able to be transferred to the station 204.

Various pneumatic gates are disposed between the different pairs of contiguous drums to provide a transfer of cards between the drums. These gates include the gates 280 and 282 shown in FIGURE 6, and also include other gates which correspond in construction and operation to the gates 280 and 282. For example, a gate 602 is disposed in contiguous relationship to the drums 276 and 279 to provide a transfer of cards from the drum 279 to the drum 276. Similarly, a gate 604 is disposed between the drums 278 and 279 to provide a transfer of cards from the drum 279 to the drum 278.

Certain additional gates are also shown in FIGURE 11. These include a gate 608 which is disposed between the drums 218 and 279 to provide a transfer of cards from the drum 218 to the drum 279. Similarly, a gate 610 is disposed in contiguous relationship to the drums 279 and 600 to provide a transfer of cards from the drum 279 to the drum 600. A gate 614 is disposed between the drums 200 and 600 to provide a transfer of cards from the drum 600 to the drum 200.

Each of the reversible stations such as the station shown in FIGURE 3 includes valve structure, the operation of which is controlled by a solenoid. This is fully described in application Serial No. 645,639 filed March 12, 1957, in the name of Alfred M. Nelson et al. Each solenoid is instrumental when energized in reversing the operation of its associated station every time that the solenoid becomes energized. For example, the solenoids associated with the station shown in FIGURE 3 are operative upon first becoming energized in bringing the stack head 20 to the operative position and in bringing the feed head 18 to the stand-by position. When the solenoid is energized a second time, it is instrumental in bringing the feed head 18 to the operative position and the stack head 20 to the stand-by position. Upon alternate energizings of the solenoid, the stack head 20 is brought to the operative position and the feed head 18 is brought to the stand-by position. At the other times that the solenoid becomes energized, the feed head 18 is brought to the operative position and the stack head 20 is moved to the stand-by position.

The solenoids for controlling the operations of the different stations shown in FIGURE 11 are illustrated somewhat schematically in that figure. For example, a solenoid 620 is associated with the station 283. Similarly, solenoids 622, 624, 626 and 628 are respectively associated with the stations 289, 226, 295 and 204. The solenoids 620, 622, 624, 626 and 628 become energized at particular times in accordance with the circuitry shown in FIGURE 9 to obtain a transfer of cards between particular stations dependent upon the particular operation being performed at any instant.

The circuitry shown in FIGURE 9 includes a switch 652 which may correspond to the switch formed by the contacts 44 and 46 in the station 10 shown in FIGURE 1. One terminal of the switch 652 may be connected to a positive terminal in a source 655 of direct voltage, and the other terminal of the switch 652 may be connected to one terminal of a capacitance 654. The signals from the capacitance are introduced to a differentiator 656. The output signals from the differentiator 656 are delayed by a stage 657 and are then introduced to input terminals of "and" networks 714 and 791.

The signals from an "and" network 658 pass to the left input terminal of a flip-flop 676 and through a delay line 677 to the right input terminal of the flip-flop. The signals on the left output terminal of the flip-flop 676 control the state of conductivity of a vacuum tube 678 which is negatively biased through a resistance 679 from the voltage source 655. The cathode of the tube 678 is grounded, and the plate of the tube is connected to one terminal of an energizing winding 680 which controls the operation of the gate 610 in FIGURE 11. The energizing winding 680 is connected to receive a positive potential from the voltage source 655.

The signals from the "and" network 658 are also introduced to the left input terminal of a flip-flop 684 and to the input terminal of a delay line 687, the output terminal of which is connected to the right input terminal of the flip-flop. The signals on the left output terminal of the flip-flop 684 control the conductivity of a tube 686 which is negatively biased through a resistance 688 from the negative terminal of the voltage source 655. The cathode of the tube 686 is grounded, and the plate of the tube is connected to an energizing winding 690 which controls the operation of the gate 614 in FIGURE 11. The energizing winding 690 is connected to receive a positive potential from the voltage source 655.

The delayed signals from the differentiator 656 also pass through an "or" network 692 to the left input terminal of a flip-flop 694 and to the input terminals of a delay line 696. The output from the delay line 696 is introduced to the right input terminal of the flip-flop 694. The signals from the left output terminal of the flip-flop 694 operatively control the conductivity of a tube 698 which is included in a circuit with solenoid 626 also shown in FIGURE 11. This solenoid controls the operation of the station 295 either to receive cards from the drum 279 or to obtain a transfer of cards to the drum. The circuit arrangement of the tube 698 and the solenoid 626 is similar to that described above for other tubes and energizing windings. The energizing of the solenoid 626 is also controlled in part by signals passing through the "or" network 692 from a delay line 705.

Signals also pass through the "or" network 692 from a differentiator 704 after being delayed by the stage 705. The differentiator 704 also introduces signals to the binary counter 662 to obtain an increase in the count indicated by the counter. The input terminal of the differentiator 704 is connected to a capacitance 706 which is in series with switches 708 and 610. The switches 708 and 710 are constructed in a manner similar to the switches formed by the contacts 44 and 46 in FIGURE 1. The switch 708 is included in the station 289 to become closed when the last card leaves the station and the switch 710 is included in the station 283 to become closed upon the movement of the last card from the station.

The binary counter 662 also includes a line 712 which is connected to input terminals of "and" networks 714 and 716. Second input terminals of the "and" networks 714 and 716 are respectively connected to the output terminals of the delay lines 657 and 705. The signals from the "and" networks 714 and 716 pass through an "or" network 718 to the left input terminal of a flip-flop 720 and to the input terminal of a delay line 722. The output terminal of the delay line 722 is connected to the right input terminal of the flip-flop 720. A connection is made from the left input terminal of the flip-flop 720 to the grid of a tube 724 which is included in a circuit with the solenoid 620 in the station 283.

The signals from the "and" networks 714 and 716 also pass through an "or" network 730 to the left input terminal of a flip-flop 732 and to the input terminal of a delay line 734. The output signals from the delay line 734 trigger the flip-flop 732 to the false state. The signals on the left output terminal of the flip-flop 732 are introduced to the grid of a tube 736 to control the conductivity of the triode. The tube 776 is included in a circuit with the solenoid 622 in the station 289. The energizing of the solenoid 622 in the station 289 is also controlled by signals passing through the "or" network 730 from the "and" network 658.

The signals from the "and" network 716 also pass through an "or" network 741 to the left input terminal of a flip-flop 740. The signals on the left output terminal of the flip-flop 740 are introduced to the grid of a tube 742 which is included in a circuit with an energizing winding 746. The winding 746 controls the operation of the gate 602 in FIGURE 11.

A transducer 750 is shown in FIGURE 11 as being disposed in coupled relationship to the cards on the drum 279. The transducer 750 is disposed between the station 295 and the gate 602 so as to control the operation of the gates 602 and 604 in accordance with information read on each card transferred from the station 295 to the drum 279. The transducer 750 is disposed relative to the card to produce a single signal for each card being moved past the transducer. This signal may be disposed in a separate row on the card. The transducer 750 is shown in FIGURE 9 as being connected to a counter 752 which is constructed to produce an output signal on a line 754 upon the occurrence of a count equal to one-half of the number of cards being processed. For example, the counter 752 may produce an output signal upon a decimal count of "6,250" when 12,500 cards are being processed. This output signal from the counter 752 is introduced to the flip-flop 740 to trigger the flip-flop to the false state.

The signal on the left output line 754 of the counter 752 is also introduced to the left input terminal of a flip-flop 756 to trigger the flip-flop to the true state. The left output terminal of the flip-flop 756 is connected to the grid of a tube 758 which is included in a circuit with an energizing winding 760. The winding 760 controls the operation of the gate 604 in FIGURE 11. The winding 760 is energized only during the time that the second half of the cards are being transferred from the station 295 to the drum 279. This results from the introduction of a first signal from the output line 754 of the counter 752 to the left input terminal of the flip-flop 756 and the introduction of a second signal from the counter 752 through a line 764 to the right input terminal of the flip-flop. An output signal is produced on the line 764 upon the passage of the last card from the station 295. When 12,500 cards are being processed, an output signal is produced on the line 764 upon a decimal count of "12,500." This output signal also causes the counter 752 to become reset to a value of zero.

A switch 782 is included in the station 204 to become closed when the last card leaves the station. One terminal of the switch 782 is connected to the positive terminal of the voltage source 665 and the second terminal of the switch 782 is connected to one terminal of a capacitance 784. The second terminal of the capacitance 784 is connected to a differentiator 786, the output signals of which pass through an "or" network 790 and the "or" network 692. Signals also pass through the "or" network 790 from an "and" network 791, the operation of which is controlled by the signals from the delay line 657 and the output line 660 of the counter 662.

The operation of the station 204 is dependent upon the passage of signals through an "or" network 788 from the "and" networks 658 and 791. The signals passing through the "or" network 788 are introduced to the left input terminal of a flip-flop 792 and to the input terminal of a delay line 794. The output signals from the delay line 794 trigger the flip-flop 792 to the false state of operation. The signals on the left output terminal of the flip-flop 792 are introduced to the grid of a tube 796 which is negatively biased through a resistance 798 from the voltage source 655. A cathode of the tube 796 is grounded and the plate is connected to the solenoid 628 in the station 204.

In like manner, the signals passing through the "or" network 790 are introduced to the left input terminal of a flip-flop 800 and to the input terminal of a delay line 802. The output signals from the delay line 802 in turn pass to the right input terminal of the flip-flop 800. The signals on the left output terminal of the flip-flop 800 are introduced to a tube 804 which is included in a circuit with the winding 624 in the station 226.

A differentiator 806 in FIGURE 9 is shown as introducing signals to the "or" networks 692 and 741. A capacitance 808 and a switch 810 are connected in a circuit between the differentiator 806 and the positive terminal of the voltage source 655. The switch 810 is included in the station 226 so as to become closed when the last card leaves the station.

The signals from the differentiator 786 are introduced to the left input terminal of a flip-flop 816 and to the input terminal of a delay line 818. The output signals from the delay line 818 pass to the right input terminal of the flip-flop 816. The signals on the left output terminal of the flip-flop 816 are introduced to the grid of a tube 820 to control the energizing of a winding 822. The winding 822 controls the activation of the gate 608.

As previously described, the cards in each subgroup are rearranged in accordance with the particular value of a control item on each card such as the first item on the card. The rearrangement of the cards occurs by merging the cards in each subgroup from the input station 283 with the cards in corresponding subgroups from the input station 289. When all of the cards have left the stations 283 and 289, the switches 710 and 708 in FIGURE 9 become closed so that a continuous circuit is established to the capacitance 706 to charge the capacitance. This causes a relatively large current to flow through the capacitance 706 so as to produce a voltage which is differentiated by the stage 704. The stage 704 is constructed to pass a signal only upon the occurrence of the first surge of current through the capacitance 706. This signal triggers the binary counter 662 so as to increase the count in the counter by an integer.

It has been described previously that a plurality of passes are performed on the cards to sort the cards by merging in accordance with the value of the first item on each card. A plurality of such merge-sort passes may be performed so that the cards can be rearranged into second subgroups before the computer operates to internally rearrange the information on the cards in each subgroup. For example, three merge-sort passes may be performed to increase the number of cards from "10" in each of the first subgroups to "80" in each of the second subgroups. During the first and second of these passes, a signal is produced on the output line 712 of the counter 662. However, in the third pass, a signal is produced on the output line 660 of the counter 662.

The "and" networks 714 and 716 become prepared for activation during the time that a signal is produced on the line 712 of the counter 662. When the "and" network 714 is prepared for activation, a signal passes through the "and" network a delayed time after the time that the last card leaves the station 295 for return to the input stations 283 and 289. This signal passes through the "or" network 718 and triggers the flip-flop 720 to the true state such that a relatively high potential is produced on the left output terminal of the flip-flop.

The high potential on the left output terminal of the flip-flop 720 causes the tube 724 to become conductive so that current flows through a circuit including a voltage source 655, the solenoid 620 and the tube. The flow of current through the solenoid 620 causes the stack head in the station 283 to become positioned in the stand-by position and the feed head in the station 283 to become moved to the operative position. In this way, cards are able to be transferred from the station 283 to the drum 276 in accordance with the activation of the hold station 287 and the gate 280 of FIGURE 6 by the circuitry shown in FIGURE 7.

The signals from the "and" network 714 also pass through the "or" network 730 and trigger the flip-flop 732 to the true state. This causes a relatively high potential to be produced on the left output terminal of the flip-flop 732 so that the tube 736 becomes conductive. The resultant flow of current through the winding 622 and the tube 736 causes the feed head in the station 289 to be moved to the operative position and the stack head in the station to be moved to the stand-by position. In this way, cards are able to be transferred from the station 289 to the drum 278 in accordance with the introduction of control signals to the valve 294 in FIGURE 6.

At the same time that a delayed signal from the differentiator 656 passes through the "and" network 714, the delayed signal also passes from the differentiator 656 through the "or" network 692 to the left input terminal of the flip-flop 694. This signal triggers the flip-flop 694 to the true state such that the tube 698 becomes conductive. When the tube 698 becomes conductive, current flows through the solenoid 626 so that the stack head in the station 295 becomes moved to the operative position and the feed head becomes moved to the stand-by position.

Since the station 295 is now in the stacking gate and the stations 283 and 289 are in the feeding mode, cards become merged from the stations 283 and 289 as they pass to the station 295. The merging occurs in accordance with the operation of the apparatus shown in FIGURE 6 and the circuitry shown in FIGURE 7, both the apparatus and the circuitry having been described in full detail previously. This merging operation causes cards in each subgroup in the station 289 to become sorted and merged with cards from each subgroup in the station 283.

After all of the cards have passed from the stations 283 and 289 to the station 295, the switches 708 and 710 become closed. This causes a signal to be produced by the differentiator 704 and to be introduced to the binary counter 662 to increase the count in the counter by an integer. Even with the additional count provided by the counter 662, an output signal may be produced on the line 712. For example, the count in the counter 712 may be increased from "1" to "2" whereas an output signal is produced on the line 660 only for each count of "3."

The signal on the line 712 is introduced to the "and" networks 714 and 716. This prepares the "and" network 716 for the passage of a delayed signal through the stage 705 from the differentiator 704. The signal passes through the "and" network 716 and the "or" network 718 to the flip-flop 720 and triggers the flip-flop 720 to the true state so as to obtain an actuation of the reversible mechanism in the station 283 from one operating mode to the other. Since the station 283 was previously in the feeding mode, it now becomes converted to a stacking mode.

The signal from the "and" network 716 also passes through the "or" network 730 and triggers the flip-flop 732 to the true state. This causes the station 289 to become converted from one operating mode to the other. Since the station 289 was previously in the feeding mode, it now becomes converted to the stacking mode. The delayed signal from the differentiator 704 also passes through the "or" network 692 to the flip-flop 694 and triggers the flip-flop to the true state. This causes the station 295 to become converted from the stacking mode to the feeding mode. In this way, cards are able to be transferred from the station 295 to the stations 283 and 289.

The signals from the "and" network 716 also pass through the "or" network 741 to the left input terminal of the flip-flop 740 and trigger the flip-flop to the true state. This causes the energizing winding 714 in the gate 602 to become energized so as to obtain an activation of the gate. Because of the activation of the gate 602, cards are transferred from the drum 279 to the drum 276 so as to become deposited in the station 283. The transducer 750 and the counter 752 operate to count the number of cards moving with the drum past the transducer. When one-half of the cards in the station 295 have become transferred from the station to the drum 279, the counter 752 produces an output signal on the line 754.

The output signal on the line 754 of the counter 752 triggers the flip-flop 740 to the false state so as to obtain a deactivation of the gate 602. At the same time, the signal on the output line 754 of the counter 752 triggers the flip-flop 756 to the true state so that the gate 604 becomes activated. This causes the cards transferred from the station 295 to the drum 279 to become subsequently transferred to the drum 278 for deposit in the station 289. The gate 604 remains activated until the last card has left the station 295. At such a time, a signal passes from the counter 752 through the output line 764 to the right input terminal of the flip-flop 756 so as to trigger the flip-flop to the false state.

In this way, one-half of the cards in the input stack 295 become transferred to the station 283 and the other half of the cards become transferred to the station 289. By transferring one half of the cards to each of the stations 283 and 289, a new merge-sort operation of the subgroups of cards in each of the stations 283 and 289 can be initiated. Such a merge-sort operation is initiated by the passage of a signal through the differentiator 656, the delay line 657 and the "and" network 714 to convert the stations 283 and 289 to the feeding mode and by the passage of a signal from the delay line 657 through the "or" network 692 to convert the station 295 to a stacking mode.

Upon the occurrence of a particular number of merge-sort passes of cards from the stations 283 and 289 to the station 295, a signal is produced on the output line 660 of the counter 662. For example, this may occur after three merge-sort passes to obtain an increase in the number of cards from "10" in each of the first subgroups to "80" in each of the second subgroups. When a signal is produced on the output line 660 of the counter 662, it prepares the "and" network 658 for the passage of a delayed signal from the delay line 705.

At the same time as the passage of a signal through the "and" network 658, the flip-flop 694 becomes triggered to the true state by the passage of a signal from the differentiator 704 to convert the station 295 from a stacking mode to a feeding mode. The signal from the "and"

network 658 is also introduced to the flip-flop 676 to trigger the flip-flop to the true state. This causes the gate 610 to become activated so that the cards transferred from the station 295 to the drum 279 become subsequently transferred from the drum 279 to the drum 600. The signal from the "and" network 658 also causes the flip-flop 684 to be triggered to the true state, thereby activating the gate 614.

When the gate 614 becomes activated, the cards on the drum 600 become transferred to the drum 200. The cards on the drum 200 then become transferred into the station 204 because of the passage of a triggering signal to the flip-flop 792 through the "or" network 788 from the "and" network 758. This triggering signal is instrumental in producing a true state of the flip-flop 792 so that the station 204 becomes converted from the feeding mode to the stacking mode.

When all of the cards have left the station 295, a signal passes from the "and" network 791 through the "or" network 788 to the flip-flop 792 and triggers the flip-flop to the true state. This causes the station 204 to become converted from a stacking mode to a feeding mode. The signal from the "and" network 791 also passes through the "or" network 790 to the flip-flop 800 and triggers the flip-flop to the true state. This causes the solenoid 624 in the station 226 to become energized so that the station becomes converted from a feeding mode to a stacking mode.

The computer 216 shown in FIGURE 4 also becomes energized at the same time that the station 204 becomes converted to a feeding mode and the station 226 becomes converted to a stacking mode. In this way, the cards in the station 204 are transferred to the drum 200 for movement with the drum past the transducing means 214 in FIGURE 4. The transducing means 214 operate to read the items of information on the different cards in each subgroup and to introduce the information to the computer 216 so that the information can be sorted in a manner similar to that described above. The cards from the station 204 then become transferred into the station 208. The information sorted by the computer 216 is recorded on cards which are transferred by the drum 218 from the station 222 to the station 226. By this process, the information in each subgroup of cards becomes re-arranged in a desired order.

Upon the transfer of the last card in the station 204 to the drum 200, the switch 782 becomes closed so that a signal is produced by the differentiator 786. This signal is introduced through the "or" network 692 to the flip-flop 694 so as to trigger the flip-flop to the true state. By triggering the flip-flop 694 to the true state, the station 295 becomes converted from a feeding mode to a stacking mode. At the same time, a signal from the differentiator 786 passes through the "or" network 790 to the flip-flop 800 so that the station 226 becomes converted from a stacking mode to a feeding mode.

The gate 608 also becomes energized upon the production of a signal by the differentiator 786 because of the triggering of the flip-flop 816 to the true state. Since the gate 608 is activated and the stations 226 and 295 are respectively in the feeding and stacking modes, the cards in the station 226 become transferred to the station 295. This causes the cards having the information re-arranged by the computer to become available for at least one merge-sort pass in which the cards become rearranged in accordance with the first item of information on each card.

When the last card leaves the station 226, the switch 810 becomes closed such that an output signal is produced by the differentiator 806. This output signal passes through the "or" network 692 to convert the station 295 to the feeding mode. The stations 283 and 289 have been previously converted to the stacking mode by the passage of signals through the "or" networks 718 and 730 from the "and" network 658. This causes the cards in the station 295 to become transferred to the stations 283 and 289 for the initiation of a new merge-sort operation.

The cards are able to become transferred from the station 295 to the station 283 since a signal passes from the differentiator 806 and the "or" network 741 to the flip-flop 740 to obtain an initial activation of the gate 602. After one-half of the cards in the station 295 have become transferred to the station 283, the gate 602 becomes de-activated and the gate 604 becomes activated in a manner similar to that described previously. This causes the remaining cards in the station 295 to become transferred to the station 289.

What is claimed is:

1. In a system for processing a group of information storage cards each having a plurality of items of information, transport means for the cards, transducing means disposed relative to the transported cards for reading and recording bits of signal information on each such card, first means responsive to the information read by the transducing means from the transported cards for initially rearranging the signal information on each card into a particular sequence, second means coupled to the first means and responsive to the signal information read by the transducing means from the transported cards for rearranging the cards into a particular sequence in accordance with the particular re-arrangement of the signal information on each card by the first means, third means coupled to the second means and responsive to the signal information read by the transducing means from the transported cards for re-arranging the signal information from each card on that card and different cards in accordance with the re-arrangement of the different cards by the second means, and means coupled to the first, second and third means for obtaining a sequential operation of the first, second and third means to obtain an alternate re-arrangement of the information on each card and then an alternate re-arrangement of the cards.

2. In a system for processing a group of information storage cards each having a plurality of items of information, transport means for the cards, first means disposed relative to the transported cards in the group for arranging the cards in the group into particular sub-groups and in a particular sequence in each sub-group in accordance with particular items of information on the cards, a computer having a capacity less than all of the items of signal information in the cards in the group, second means coupled to the computer and responsive to the arrangement of the cards in the different sub-groups for activating the computer to obtain a re-arrangement in the particular sequence of the items of information in the cards in the different sub-groups, and means coupled to the first and second means for obtaining an operation of the first means to obtain a re-arranging of the cards in each sub-group and for subsequently obtaining an operation of the second means to obtain a re-arrangement in the particular sequence of the items of information in the cards in the different sub-groups.

3. In a system for processing a group of information storage cards each having a plurality of items of information, transport means for the cards, transducing means disposed relative to the transported cards for reading and recording items of information on each such card, computer means having a capacity less than the total number of items of information in the cards in the group, first means including the computer means coupled to the transducing means and responsive to the information read by the transducing means from the transported cards for providing a plurality of transfers of items of information between different ones of the transported cards to provide a re-arrangement of such items of information in accordance with the information on successive cards, second means coupled to the last mentioned means and to the transducing means and responsive to particular items of information read on each transported card by the transducing means for re-arranging the cards in accordance with such particular items of information after each transfer of items of information between the cards by the computer means, and means coupled to the first and second means for obtaining an alternate operation of the first means to provide a re-arrangement of the items of information in accordance with the information on successive cards and for obtaining an alternate operation of the second means to provide a re-arrangement of the cards in accordance with particular items of information read on each transported card.

4. In a system for processing a group of information storage cards each having a plurality of items of information, transport means for the cards, transducing means disposed relative to the transported cards for reading and recording items of information on each such card, computer means having a capacity less than the total number of items of information in the cards in the group, first means including the computer means and coupled to the transducing means and responsive to the items of information read by the transducing means from the transported cards for providing a re-arrangement of the items of information on each card into a particular sequence, second means coupled to the last mentioned means and to the transducing means and responsive to particular items of information read on each transported card by the transducing means for re-arranging the cards in accordance with such particular items of information and after each re-arrangement of the items of information on the cards, and means coupled to the first and second means to obtain an alternate operation of the first means in providing a re-arrangement of the items of information on each card into a particular sequence and to obtain an alternate operation of the second means in providing a re-arranging of the cards in accordance with the particular items of information on the cards.

5. In a system for processing a group of information storage cards each having a plurality of items of information, means including electrical circuitry responsive in a plurality of successive passes to particular items of information on each card for rearranging the cards into sub-groups in each the subgroups in each pass include greater numbers of cards than the numbers of cards in the sub-groups in the previous pass, a computer having a capacity for receiving a number of items of information less than the total number of items of information in all of the cards of each sub-group, first means including electrical circuitry operatively coupled to the computer and responsive in a plurality of successive passes to the cards in each sub-group for transferring the items of information on the cards in each sub-group to the computer for re-arrangement of the items of information on the cards in each sub-group, second means including electrical circuitry operatively coupled to the computer and responsive to each re-arrangement of the items of information by the computer for re-arranging the cards in the sub-groups in the next pass in accordance with the particular items of information in the cards in the sub-group, and means including electrical circuitry operatively coupled to the first and second means for obtaining an operation of the first means in alternate passes in providing a re-arrangement of the items of information on the cards in each sub-group and for obtaining an operation of the second means in the other passes in providing a re-arranging of the cards in the sub-groups in accordance with the particular items of information in the cards in the sub-group.

6. In a system for processing a group of information storage cards each having a plurality of items of information, first means including electrical circuitry responsive to particular items of information on each card for re-arranging into a particular relationship the cards in first sub-groups in which each of the first sub-groups has a first particular number of cards; a computer operative to receive a plurality of items of information and to re-arrange such items of information into the particular relationship; second means including electrical circuitry operatively coupled to the first means and to the computer and responsive to the re-arrangement of the cards for introducing the items of information from the cards in successive ones of the first sub-groups to the computer for re-arrangement of the items of information on the cards in each sub-group; third means including electrical circuitry operatively coupled to the second means and responsive to the re-arrangement of the items of information on the cards in each of the successive ones of the first sub-groups for introducing the items of information in re-arranged order to cards; fourth means including electrical circuitry operatively coupled to the third means and responsive to the introduction of the items of information from the computer to the cards in re-arranged form for re-arranging the cards into the particular relationship in accordance with the particular items of information on the cards and wherein each of the second sub-groups has a particular number of cards greater than the first particular number, and fifth means operatively coupled to the first, second, third and fourth means and respectively responsive to the completion of the operation by the first, second and third means for initiating the operation of the second, third and fourth means.

7. In a system for processing a group of information storage cards each having a plurality of items of information, first means responsive to particular items of information for re-arranging the cards in each group of a plurality of sub-groups in accordance with such information, a computer operative to re-arrange a plurality of items of information wherein the number of items in the plurality is greater than the number of items in a single card, second means operatively coupled to the first means and to the computer and responsive to the re-arrangement of the cards in each sub-group for introducing the information from a particular number of the successive cards in each re-arranged sub-group to the computer to obtain a re-arrangement of such information by the computer, third means operatively coupled to the computer and operative upon the re-arrangement of the information introduced to the computer to introduce the re-arranged items of information to cards, fourth means operatively coupled to the third means and to the computer and responsive to the introduction of all of the information in each of the re-arranged cards from the computer to cards to introduce the items of information from the next card in each re-arranged sub-group to the computer for re-arrangement by the computer with the information still remaining in the computer from the previous cards in the re-arranged sub-group, and fifth means operatively coupled to the first, second, third and fourth means and respectively responsive to the completion of operations by the first, second and third means to obtain an initiation of operations by the second, third and fourth means.

8. In a system for processing a group of information storage cards each having a plurality of items of information, transport means for the cards, transducing means disposed relative to the transported cards for processing particular items of information on each of the cards, first means including electrical circuitry operatively coupled to the transducing means and responsive to the information processed by the transducing means for obtaining a merger of the cards in first sub-groups with the cards in second sub-groups in accordance with the processed items of information, second means including electrical circuitry operatively coupled to the first means and operative upon the completion of each merger of the cards in the first and second sub-groups for dividing the cards for the institution of a new merging operation, third means including electrical circuitry operatively coupled to the second means and responsive to the initiation of each merger operation for forming new ones of the first and second sub-groups in which the cards in the new ones of the first and second sub-groups have a progressively increased number of cards relative to the number of cards in the sub-groups in the previous merger, and fourth means operatively coupled to the first, second and third means and respectively operative upon the operation of the first and second means for initiating an operation of the second and third means.

9. In a system for processing a group of information storage cards each having a plurality of items of information, transport means for the cards, transducing means disposed relative to the transported cards for processing particular item of information on each of the cards, first means including electrical circuitry coupled to the transducing means for obtaining a re-arrangement of the cards in each of a plurality of sub-groups in accordance with the particular items of information, second means including electrical circuitry operativley coupled to the first means and responsive to the re-arrangement of the cards in the different sub-groups in each pass for obtaining the initiation of a new pass for the re-arrangement of the cards, third means including electrical circuitry operatively coupled to the second means and responsive to the initiation of each new pass for progressively increasing the number of cards in each sub-group in that pass relative to the number of cards in each sub-group in the previous pass, and fourth means operatively coupled to the first, second and third means for obtaining a sequential operation of the first, second and third means in initiating and completing each new pass.

10. In a system for processing a group of information storage cards each having a plurality of items of information, first means including first electrical circuitry responsive to particular items of information on the cards to re-arrange the cards in particular order in accordance with such paticular items of information, a computer constructed to receive a plurality of items of information and to re-arrange such information in the particular order, second means including second electrical circuitry operatively coupled to the computer and responsive to the items of information on the cards for introducing such items of information to the computer for re-arrangement in the particular order by the computer, third means including third electrical circuitry operatively coupled to the computer and responsive to the re-arrangement of the items of information by the computer for introducing such items of information in the re-arranged order to cards for recording on the cards, and fourth means operatively coupled to the first, second and third means and responsive to the re-arrangement of the cards by the first means for initiating a sequential operation of the second and third means to obtain the re-arrangement of the items of information in the particular order by the computer and the introduction of such items of information in the re-arranged order to cards for recording on the cards.

11. The system set forth in claim 10 in which the first means including the first electrical circuitry are operative to re-arrange the cards into first sub-groups each having a first particular number of cards and in which the second means including the second electrical circuitry are responsive to the recording of the items of information on the cards to re-arrange the cards into second sub-groups each having a second particular number of cards different from the number of cards in the first sub-groups.

12. In a system for processing a group of information storage cards each having a plurality of items of information, a computer constructed to receive a plurality of items of information and to rearrange such information in a particular order, first means including electrical circuitry opeatively coupled to the computer and responsive to the items of information on the cards for introducing such items of information to the computer for re-arrangement in the particular order by the computer, second means including electrical circuitry operatively coupled to the computer and responsive to the re-arrangement of the items of information by the computer for introducing such items of information in re-arranged form to cards for recording on the cards, third means including electrical circuitry operatively coupled to the computer and to the second means and responsive to the recording of the items of information from the computer to the cards for re-arranging the cards in the particular order in accodance with particular items of information on the cards, and fourth means operatively coupled to the first, second and third means and responsive to the operation of the first means for initiating a sequential operation of the second and third means to obtain a recording of the information in re-arranged form on the cards and to obtain a subsequent re-arranging of the cards in the particular order in accordance with the particular items of information on the cards.

13. The system set forth in claim 12 in which fifth means including electrical circuitry are operatively coupled to the third means and are responsive to the re-arrangement of the cards in accordance with the particular items of information on the cards to obtain an introduction of the information to the computer for a further re-arrangement of the information in the particular order by the computer and in which the fourth means are operatively coupled to the third means and the fifth means to initiate the operation of the fifth means after the operation of the third means.

14. In a system for processing a group of information storage cards each having a plurality of items of information, transport means for the cards, transducing means disposed relative to the cards on the transport means for processing particular items of information on such cards, first means including electrical circuitry operatively coupled to the transducing means for obtaining a re-arrangement of the cards in sub-groups in a particular order in accordance with the information processed on the cards wherein the sub-groups have progressive numbers of cards with successive passes of the cards, and second means including a computer operatively coupled to the first means and responsive to the information on the cards in the sub-groups upon the re-arrangement of the cards in the sub-groups for re-arranging the items of information on the cards in the sub-group into the particular order, and third means operatively coupled to the first and second means and responsive to the question of the first means in rearranging the cards to institute an operation of the second means in re-arranging the items of information on the cards in the sub-groups into the particular order.

15. In a system for processing a group of information storage cards each having a plurality of items of information, first transport means for the cards, transducing means disposed relative to the cards on the transport means for processing particular information on such cards, first input means constructed to hold first subgroups of the cards in the group, second input means constructed to hold second sub-groups of the cards in the group, first and second retaining means respectively disposed relative to the cards in the first and second input means to provide a controlled transfer of the cards in the input means to the transport means, output means constructed to hold the cards in the group, restraining means coupled to the cards on the transport means for controlling the transfer of cards from the transport means to the output means, first means including first electrical circuitry coupled to the transducing means for controlling the operation of the restraining means in accordance with the particular information processed on the transported cards to obtain the movement of cards to the output means in accordance with such processed information, second means including second electrical circuitry coupled to the transducing means for controlling the operation of the retaining means in accordance with the information from a particular one of the first and second input means upon each transfer of a transported card to the output means and in accordance with the particular card transferred to the output means, third means including third electrical circuitry operative upon the transported cards for obtaining a merger of sub-groups of cards from the first and second input means to the output means, fourth means including fourth electrical circuitry operatively coupled to the first, second and third means and operative upon the transported cards for initiating a plurality of merging passes of the cards in the group from the first and second input means to the output means, and fifth means including fifth electrical circuitry operatively coupled to the first, second, third and fourth means and operative upon the completion of each pass of the cards to progressively increase the number of cards in each of the sub-groups in the next merging pass.

16. The system as set forth in claim 15 in which a computer is provided to re-arrange in a particular sequence information introduced to the computer, in which sixth means are operatively coupled to the computer and responsive to the rearrangement and merging of the cards in sub-groups to introduce the information on the cards in each sub-group to the computer for re-arrangement of the items of information in such cards and between the different cards in each sub-group, and in which seventh means are operatively coupled to the computer and to the sixth means and are responsive to the re-arrangement of the information on the cards in each sub-group to obtain a recording of the information in the re-arranged form on cards, and in which eighth means are operatively coupled to the seventh means and are responsive to the recording of the information from the computer to the cards of each sub-group for obtaining a new merging pass of the cards on which the information has been recorded from the computer and in which ninth means are operatively coupled to the fourth, fifth, sixth, seventh and eighth means to initiate in alternate passes merging passes of the cards and to initiate in the other passes the re-arrangement of the items of information in the cards.

17. In a system for processing a group of information storage cards each having a plurality of items of information, transport means for the cards, transducing means disposed relative to the cards on the transport means for processing particular items of information on such cards, first means including first electrical circuitry operatively coupled to the transducing means for obtaining a re-arrangement of the cards in sub-groups in a particular order in accordance with the particular items of information processed on the cards wherein the number of cards in each sub-group in successive passes increases progressively, second means including second electrical circuitry operatively coupled to the first means and responsive to the cards in successive passes for obtaining a progressive increase in the number of cards in each subgroup, third means including a computer operatively coupled to the transducing means and responsive to the information on the cards in each sub-group upon the re-arrangement of the cards in the sub-groups for re-arranging the information on a particular number of cards in the sub-group in the particular order and for obtaining a recording of such information in re-arranged order on cards, fourth means operatively coupled to the third means and responsive to the re-arrangement of the information on each card by the computer and the recording of such information on cards for obtaining the introduction of the information in a next card in the sub-group to the computer for re-arrangement of such information with the information still in the computer, and fifth means operatively coupled to the first, second, third and fourth means and respectively responsive to the operation of the first, second and third means for initiating the operation of the second, third and fourth means.

References Cited by the Examiner
UNITED STATES PATENTS

| | | | |
|---|---|---|---|
| 2,901,732 | 8/1959 | Canning | 340—172.5 |
| 2,907,003 | 9/1959 | Hobbs | 340—172.5 |
| 2,911,622 | 11/1959 | Ayres | 340—172.5 |
| 2,996,184 | 8/1961 | Barton | 340—172.5 |

MALCOLM A. MORRISON, *Primary Examiner.*

EVERETT R. REYNOLDS, STEPHEN W. CAPELLI,
*Examiners.*